(12) United States Patent
Suzuki et al.

(10) Patent No.: US 12,486,910 B2
(45) Date of Patent: Dec. 2, 2025

(54) EIGHT-WAY VALVE

(71) Applicant: TOYOTA JIDOSHA KABUSHIKI KAISHA, Toyota (JP)

(72) Inventors: Tomoaki Suzuki, Nagoya (JP); Hiroshi Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 18/632,475

(22) Filed: Apr. 11, 2024

(65) Prior Publication Data

US 2024/0410476 A1    Dec. 12, 2024

(30) Foreign Application Priority Data

Jun. 6, 2023   (JP) ................................ 2023-093014

(51) Int. Cl.
  *F16K 11/072*    (2006.01)
  *B60H 1/00*      (2006.01)

(52) U.S. Cl.
  CPC ........ *F16K 11/072* (2013.01); *B60H 1/00814* (2013.01)

(58) Field of Classification Search
  CPC ..... Y10T 137/86863; Y10T 137/86871; F16K 11/072; F16K 11/085; F16K 11/0853; F16K 11/0856; F16K 27/065; B60H 1/00814; B60H 1/32284; B60H 2001/00935
  See application file for complete search history.

(56) References Cited

U.S. PATENT DOCUMENTS

2021/0301691 A1    9/2021   Hasegawa et al.

FOREIGN PATENT DOCUMENTS

JP    2021-154767 A   10/2021

*Primary Examiner* — Jessica Cahill
(74) *Attorney, Agent, or Firm* — Oliff PLC

(57) ABSTRACT

An eight-way valve including a housing and a rotary member is provided. The housing includes an annular wall, a first chamber, a second chamber, a third chamber, and a fourth chamber. The annular wall is provided with 16 upper-tier openings and 16 lower-tier openings. The rotary member includes an upper-tier switching part configured to switch between opening and closing of each of the 16 upper-tier openings, and a lower-tier switching part configured to switch between opening and closing of each of the 16 lower-tier openings. The upper-tier switching part includes an upper-tier first communication passage, an upper-tier second communication passage, and an upper-tier closing part, and the lower-tier switching part includes a lower-tier first communication passage, a lower-tier second communication passage, and a lower-tier closing part. Any one of a first space to an eighth space is respectively provided with a port.

8 Claims, 14 Drawing Sheets

EIGHT-WAY VALVE

CROSS-REFERENCE TO RELATED APPLICATION

This application claims priority to Japanese Patent Application No. 2023-093014 filed on Jun. 6, 2023 incorporated herein by reference in its entirety.

BACKGROUND

1. Technical Field

The present disclosure relates to an eight-way valve.

2. Description of Related Art

For example, Japanese Unexamined Patent Application Publication No. 2021-154767 (JP 2021-154767 A) discloses a heat management system including a first heat circuit including a battery, a PCU, etc., a second heat circuit that functions mainly to cool air in a vehicle cabin, and a third heat circuit that functions mainly to warm air in the vehicle cabin. Each circuit is provided with a switching valve that switches flow passages.

SUMMARY

There is room for improvement on switching valves in heat management circuits like the one described in JP 2021-154767 A.

Therefore, the present disclosure provides an eight-way valve as a switching valve capable of switching among a plurality of modes.

An aspect of the present disclosure relates to an eight-way valve including a housing and a rotary member. This eight-way valve can be provided in a heat management circuit. The rotary member is configured to be rotatable relative to the housing. The housing includes an annular wall, a first chamber, a second chamber, a third chamber and a fourth chamber, each of the chambers being respectively configured to define two spaces. The annular wall is provided with 16 upper-tier openings and 16 lower-tier openings. The rotary member includes an upper-tier switching part configured to switch between opening and closing of each of the 16 upper-tier openings, and a lower-tier switching part configured to switch between opening and closing of each of the 16 lower-tier openings. The upper-tier switching part includes an upper-tier first communication passage, an upper-tier second communication passage, and an upper-tier closing part. The lower-tier switching part includes a lower-tier first communication passage, a lower-tier second communication passage, and a lower-tier closing part. Each of the spaces is respectively provided with a port.

In the eight-way valve of the aspect of the present disclosure, the rotary member may be disposed inside the housing.

In the eight-way valve of the aspect of the present disclosure, the housing may surround an outer circumferential surface of the rotary member.

In the eight-way valve of the aspect of the present disclosure, the first chamber may be provided on an outer side of the annular wall in a radial direction of the rotary member. The first chamber may be configured to define, together with the annular wall, a first space and a second space that are separated from each other.

In the eight-way valve of the aspect of the present disclosure, the second chamber may be provided on an outer side of the annular wall in a radial direction, at a position adjacent to the first chamber in a circumferential direction of the rotary member. The second chamber may be configured to define, together with the annular wall, a third space and a fourth space that are separated from each other.

In the eight-way valve of the aspect of the present disclosure, the third chamber may be provided on an outer side of the annular wall in a radial direction, at a position adjacent to the second chamber in a circumferential direction. The third chamber may be configured to define, together with the annular wall, a fifth space and a sixth space that are separated from each other.

In the eight-way valve of the aspect of the present disclosure, the fourth chamber may be provided on an outer side of the annular wall in a radial direction, at a position adjacent to both of the third chamber and the first chamber in a circumferential direction. The fourth chamber may be configured to define, together with the annular wall, a seventh space and an eighth space that are separated from each other.

In the eight-way valve of the aspect of the present disclosure, the housing may include the annular wall. The housing may include a housing main body having such a shape that each of the spaces opens in an up-down direction, an upper cover connected to the housing main body and configured to close each of the spaces from above, and a lower cover connected to the housing main body and configured to close each of the spaces from below.

According to the eight-way valve of the aspect of the present disclosure, a switching valve capable of switching among a plurality of modes can be provided.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
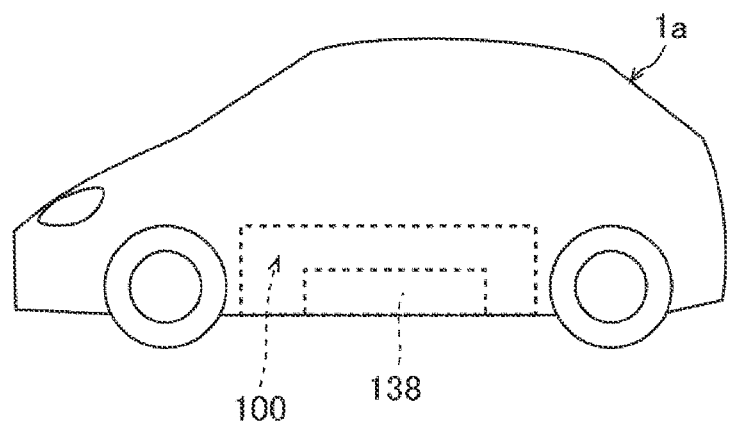
FIG. 1 is a view schematically showing an electrified vehicle equipped with a heat management circuit including an eight-way valve in an embodiment as one example of the present disclosure.

An embodiment as one example of the present disclosure will be described in detail below with reference to the drawings. The same or corresponding parts in the drawings will be denoted by the same reference sign and the description thereof will not be repeated.

FIG. 1 is a view schematically showing an electrified vehicle equipped with a heat management circuit including an eight-way valve in the embodiment of the present disclosure. An electrified vehicle 1a is preferably a vehicle equipped with a battery 138 for traveling, and is, for example, a battery electric vehicle (BEV). The electrified vehicle 1a may be a hybrid electric vehicle (HEV), or may be a plug-in hybrid electric vehicle (PHEV), or may be a fuel cell electric vehicle (FCEV). However, applications of the heat management circuit according to the present disclosure are not limited to vehicles.

Figure 2:
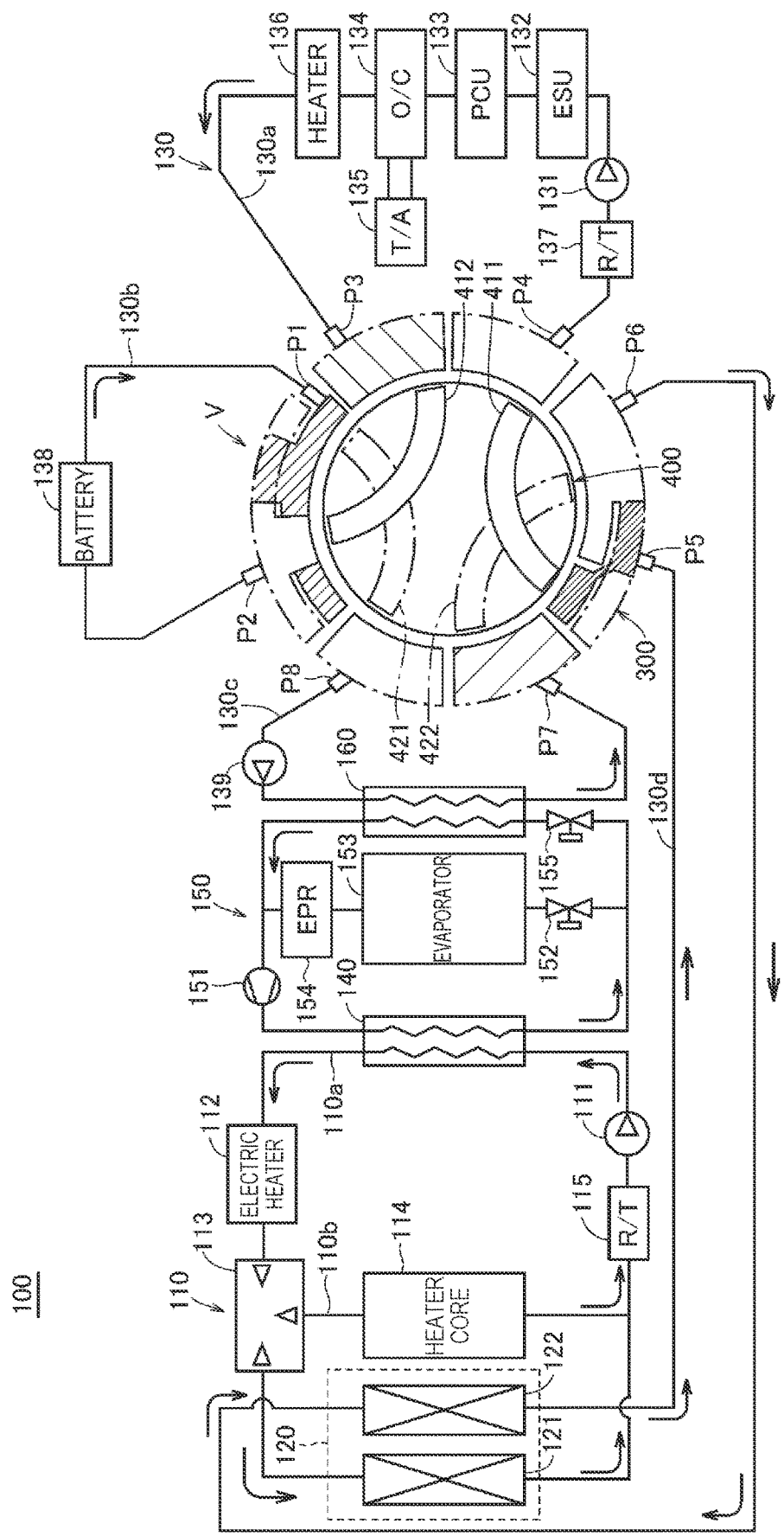
FIG. 2 is a diagram showing the configuration of the heat management circuit shown in FIG. 1.

Next, the overall configuration of the heat management circuit will be described. FIG. 2 is a diagram showing the configuration of the heat management circuit. A heat management circuit 100 is configured such that a medium (water etc.) that exchanges heat flows through it. As shown in FIG. 2, the heat management circuit 100 includes, for example, a high-temperature circuit 110, a radiator 120, a low-temperature circuit 130, a condenser 140, a refrigeration cycle 150, a chiller 160, and an eight-way valve V.

The high-temperature circuit 110 includes a water pump (W/P) 111, an electric heater 112, a three-way valve 113, a heater core 114, a reservoir tank (R/T) 115, a flow passage 110a that connects the water pump 111, the electric heater 112, the three-way valve 113, the reservoir tank 115, and the water pump 111 in this order, a flow passage 110b that connects the three-way valve 113, the heater core 114, and the reservoir tank 115 in this order, and a heat medium (water etc.; not shown).

The water pump 111 sends the heat medium having flowed out of the reservoir tank 115 toward the electric heater 112. The electric heater 112 heats the heat medium. Using the heat medium, the heater core 114 heats air that is supplied to a vehicle cabin (not shown) in the electrified vehicle 1a. The reservoir tank 115 stores part of the heat medium inside the high-temperature circuit 110 to thereby maintain the pressure and the amount of the heat medium inside the high-temperature circuit 110.

As shown in FIG. 2, the high-temperature circuit 110 is provided with the high-temperature radiator 121 and the condenser 140. The high-temperature radiator 121 is provided at a portion of the flow passage 110a on a downstream side of the three-way valve 113 but on an upstream side of the reservoir tank 115. The high-temperature radiator 121 makes the heat medium and outside air exchange heat with each other. The condenser 140 is provided at a portion of the flow passage 110a on the downstream side of the water pump 111 but on the upstream side of the electric heater 112. The condenser 140 makes the heat medium and a working medium (water or a medium with a lower boiling point than water, etc.) in the refrigeration cycle 150 exchange heat with each other.

The three-way valve 113 switches a flow route of the heat medium such that the heat medium flows along at least one of a first route and a second route. The first route is a route along which the heat medium circulates from the water pump 111 to the condenser 140 to the electric heater 112 to the three-way valve 113 to the high-temperature radiator 121 to the reservoir tank 115 to the water pump 111 in this order. The second route is a route along which the heat medium circulates from the water pump 111 to the condenser 140 to the electric heater 112 to the three-way valve 113 to the heater core 114 to the reservoir tank 115 to the water pump 111 in this order.

The low-temperature circuit 130 includes, for example, a first water pump 131, an electricity supply unit (ESU) 132, a power control unit (PCU) 133, an oil cooler (O/C) 134, a transaxle 135, a heater 136, a reservoir tank 137, a battery 138, a second water pump 139, a first flow passage 130a, a second flow passage 130b, a third flow passage 130c, a fourth flow passage 130d, a heat medium (water etc.; not shown), and an eight-way valve V.

The first flow passage 130a connects the eight-way valve V, the reservoir tank 137, the first water pump 131, the ESU 132, the PCU 133, the oil cooler 134, the heater 136, and the eight-way valve V in this order. The first flow passage 130a is thermally in contact with the ESU 132, the PCU 133, and the oil cooler 134.

The first water pump 131 sends the heat medium having flowed out of the reservoir tank 137 to the ESU 132. The ESU 132 controls charging and discharging of the battery 138 etc. The PCU 133 converts direct-current power supplied from the battery 138 into alternating-current power, and supplies this alternating-current power to a motor (not shown) that is incorporated in the transaxle 135. The oil cooler 134 circulates lubricating oil of the motor using an electric oil pump (not shown). The oil cooler 134 makes the heat medium flowing through the first flow passage 130a and the lubricating oil exchange heat with each other to thereby cool the lubricating oil. As a result, the transaxle 135 is cooled. The ESU 132, the PCU 133, and the oil cooler 134 are cooled by the heat medium flowing through the first flow passage 130a. The heater 136 heats the heat medium as necessary. The reservoir tank 137 stores part of the heat medium inside the low-temperature circuit 130 to thereby maintain the pressure and the amount of the heat medium inside the low-temperature circuit 130.

The second flow passage 130b connects the eight-way valve V, the battery 138, and the eight-way valve V in this order. The second flow passage 130b is thermally in contact with the battery 138. The battery 138 supplies electric power for traveling to the motor incorporated in the transaxle 135. The battery 138 can be driven such that the temperature of the battery 138 rises. The battery 138 is heated or cooled by the heat medium flowing through the second flow passage 130b.

The third flow passage 130c connects the eight-way valve V, the second water pump 139, the chiller 160, and the eight-way valve V in this order. The second water pump 139 sends the heat medium having flowed out of the eight-way valve V to the chiller 160. The chiller 160 makes the heat medium and the working medium in the refrigeration cycle 150 exchange heat with each other.

The fourth flow passage 130d connects the eight-way valve V, the low-temperature radiator 122, and the eight-way valve V in this order. The low-temperature radiator 122 is disposed near the high-temperature radiator 121. The heat medium flowing through an inside of the low-temperature radiator 122 exchanges heat with the heat medium flowing through an inside of the high-temperature radiator 121. As shown in FIG. 2, the high-temperature radiator 121 and the low-temperature radiator 122 compose a single radiator 120.

Thus, the radiator 120 is connected to (i.e., shared by) both of the high-temperature circuit 110 and the low-temperature circuit 130.

The refrigeration cycle 150 is connected to the condenser 140 and the chiller 160. The refrigeration cycle 150 includes a compressor 151, an expansion valve 152, an evaporator 153, an evaporative pressure regulator (EPR) 154, an expansion valve 155, and the working medium (water or a medium with a lower boiling point than water, etc.; not shown).

The compressor 151 compresses the working medium. The condenser 140 makes the working medium in a gas phase having been discharged from the compressor 151 and the heat medium flowing through the high-temperature circuit 110 exchange heat with each other to thereby condense the working medium. The expansion valve 152 and the expansion valve 155 expand the working medium having flowed out of the condenser 140. The evaporator 153 makes the working medium having flowed out of the expansion valve 152 and air supplied to the vehicle cabin in the electrified vehicle exchange heat with each other to thereby evaporate the working medium. The evaporative pressure regulator 154 regulates the pressure of the working medium having flowed out of the evaporator 153. The chiller 160 makes the working medium having flowed out of the expansion valve 155 and the heat medium flowing through the low-temperature circuit 130 exchange heat with each other to thereby evaporate the working medium. The working medium in a gas phase having flowed out of the evaporative pressure regulator 154 and the chiller 160 flows into the compressor 151.

Next, the eight-way valve V will be described with reference to FIG. 3 to FIG. 7. The eight-way valve V is connected to each of the flow passages 130*a* to 130*d*. The eight-way valve V switches the connection state of each of the flow passages 130*a* to 130*d*.

Figure 3:
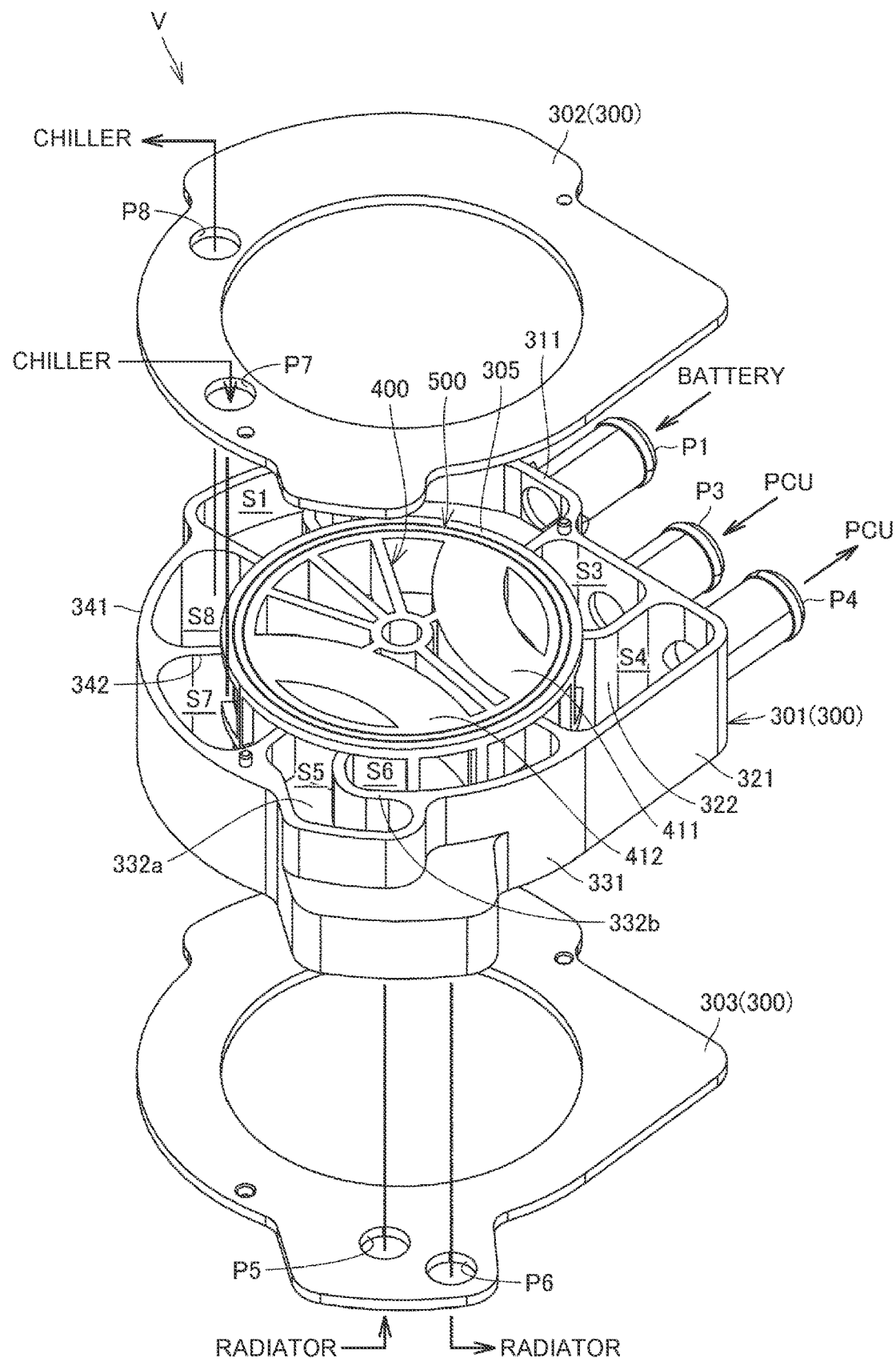
FIG. 3 is an exploded perspective view from above of the eight-way valve shown in FIG. 2.
Figure 4:
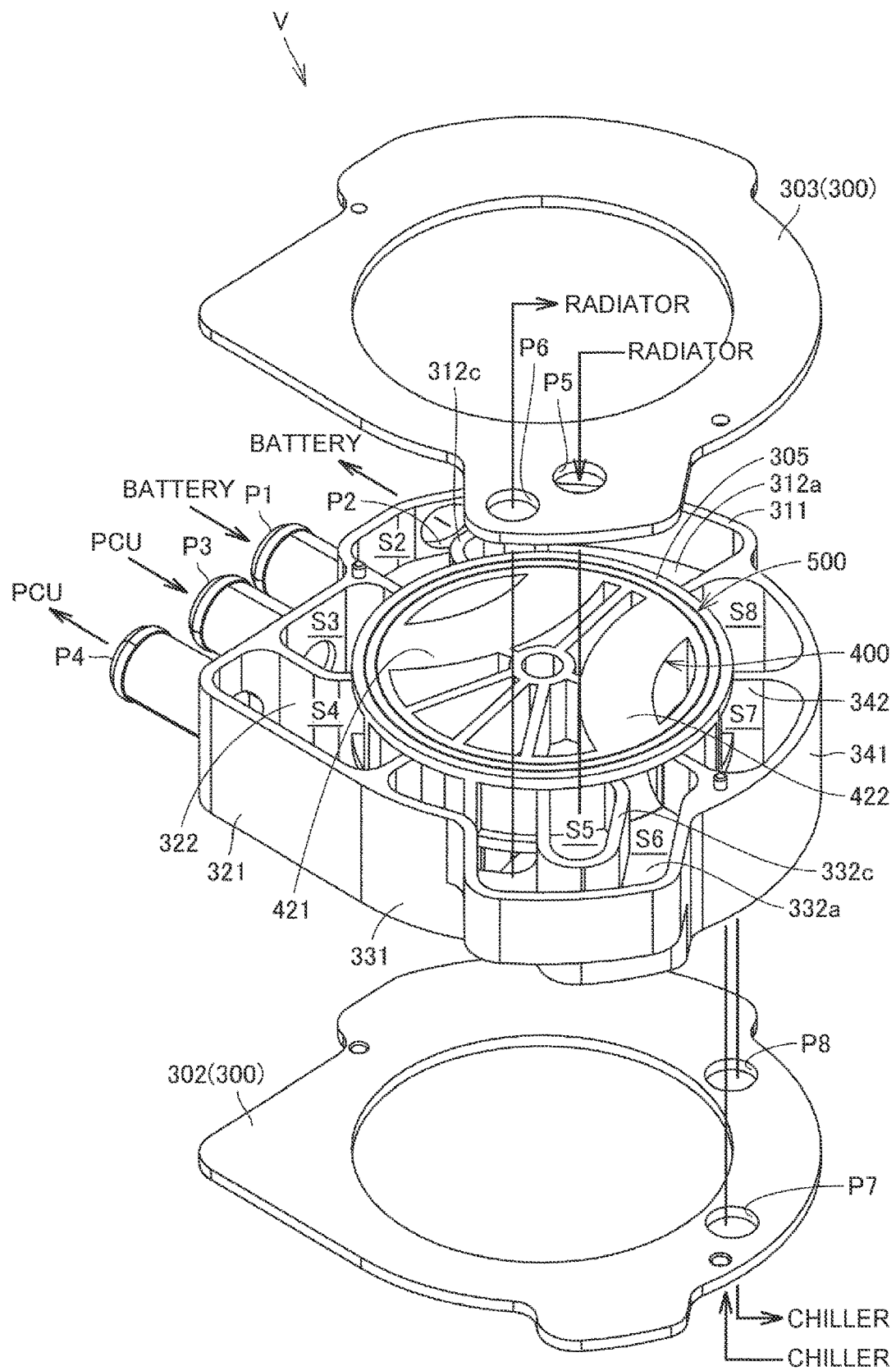
FIG. 4 is an exploded perspective view from below of the eight-way valve.

The eight-way valve V includes a housing 300, a rotary member 400, and a gasket 500 (see FIG. 3 and FIG. 4).

The housing 300 houses the rotary member 400 and the gasket 500. The housing 300 includes an annular wall 305, a first chamber C1, a second chamber C2, a third chamber C3, and a fourth chamber C4.

The annular wall 305 surrounds an outer circumferential surface of the rotary member 400. The annular wall 305 is formed in an annular shape, more specifically a circular annular shape. As shown in FIG. 3 to FIG. 7, the annular wall 305 is provided with 16 upper-tier openings U1 to U16 and 16 lower-tier openings L1 to L16. Each opening penetrates the annular wall 305 in a radial direction thereof.

The 16 upper-tier openings U1 to U16 are disposed so as to be arrayed at intervals along a circumferential direction of the annular wall 305. The 16 upper-tier openings U1 to U16 are disposed so as to be arrayed at equal intervals along the circumferential direction. As the 16 upper-tier openings U1 to U16, the first upper-tier opening U1 to the sixteenth upper-tier opening U16 sequentially arrayed toward one side in the circumferential direction (clockwise as seen in a plan view) are provided.

The 16 lower-tier openings L1 to L16 are provided under the 16 upper-tier openings U1 to U16. The 16 lower-tier openings L1 to L16 are disposed so as to be arrayed at intervals in the circumferential direction of the annular wall 305. The 16 lower-tier openings L1 to L16 are disposed so as to be arrayed at equal intervals along the circumferential direction. As the 16 lower-tier openings L1 to L16, the first lower-tier opening L1 to the sixteenth lower-tier opening L16 sequentially arrayed toward the one side in the circumferential direction are provided. The first lower-tier opening L1 to the sixteenth lower-tier opening L16 are provided under the first upper-tier opening U1 to the sixteenth upper-tier opening U16, respectively.

Figure 5:
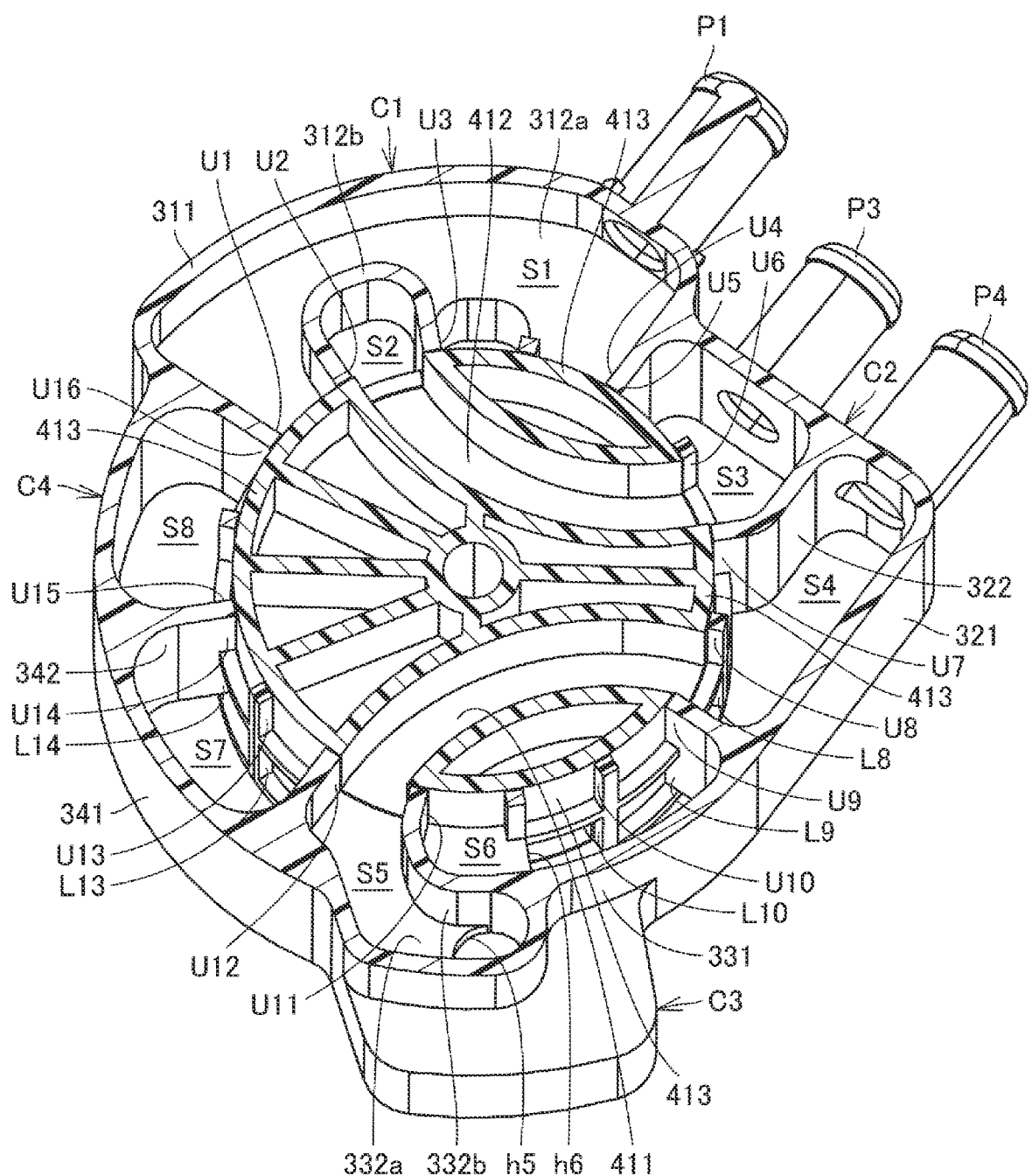
FIG. 5 is a sectional view of the eight-way valve at an upper tier.
Figure 6:
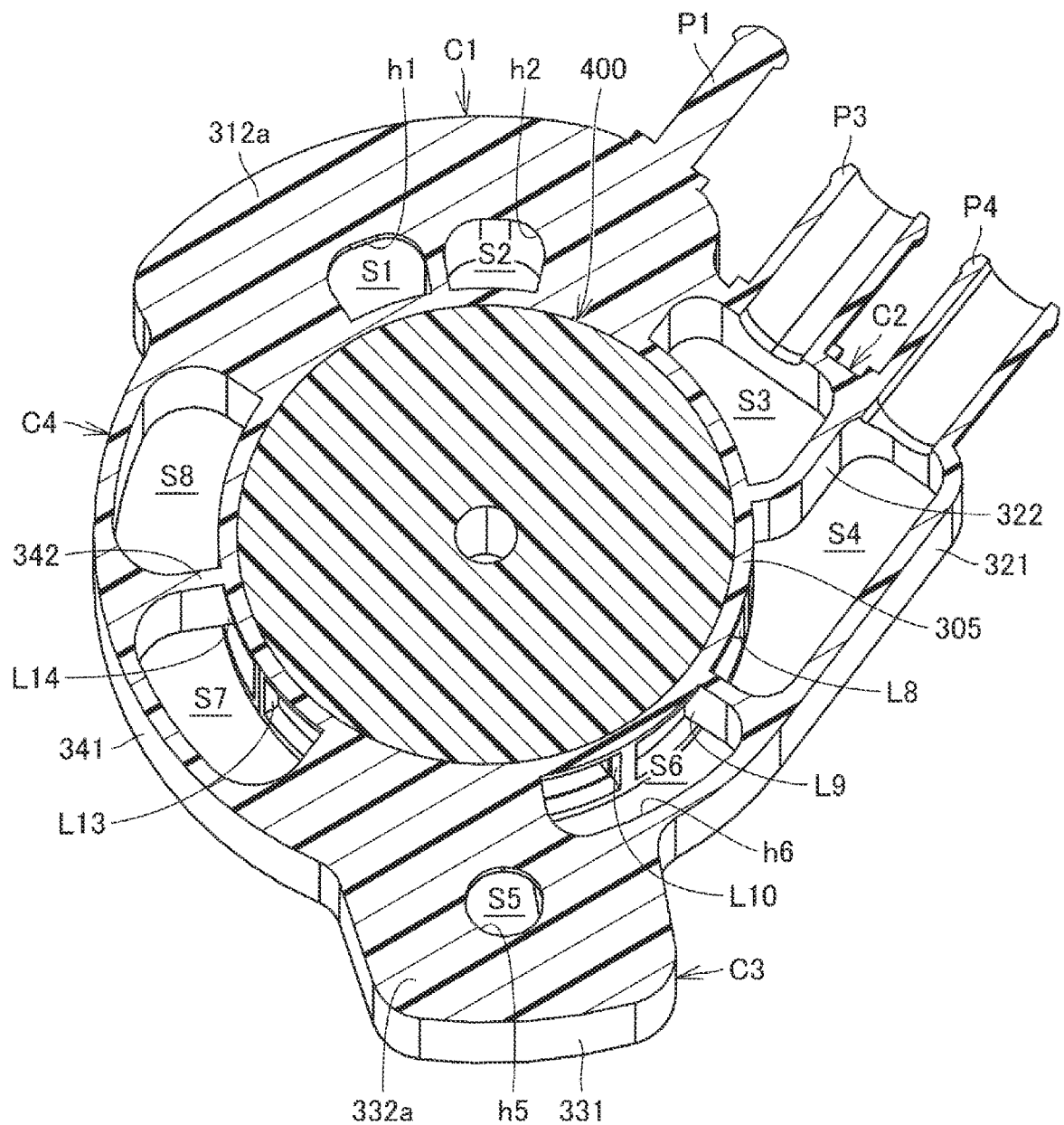
FIG. 6 is a sectional view of the eight-way valve at a middle tier.
Figure 7:
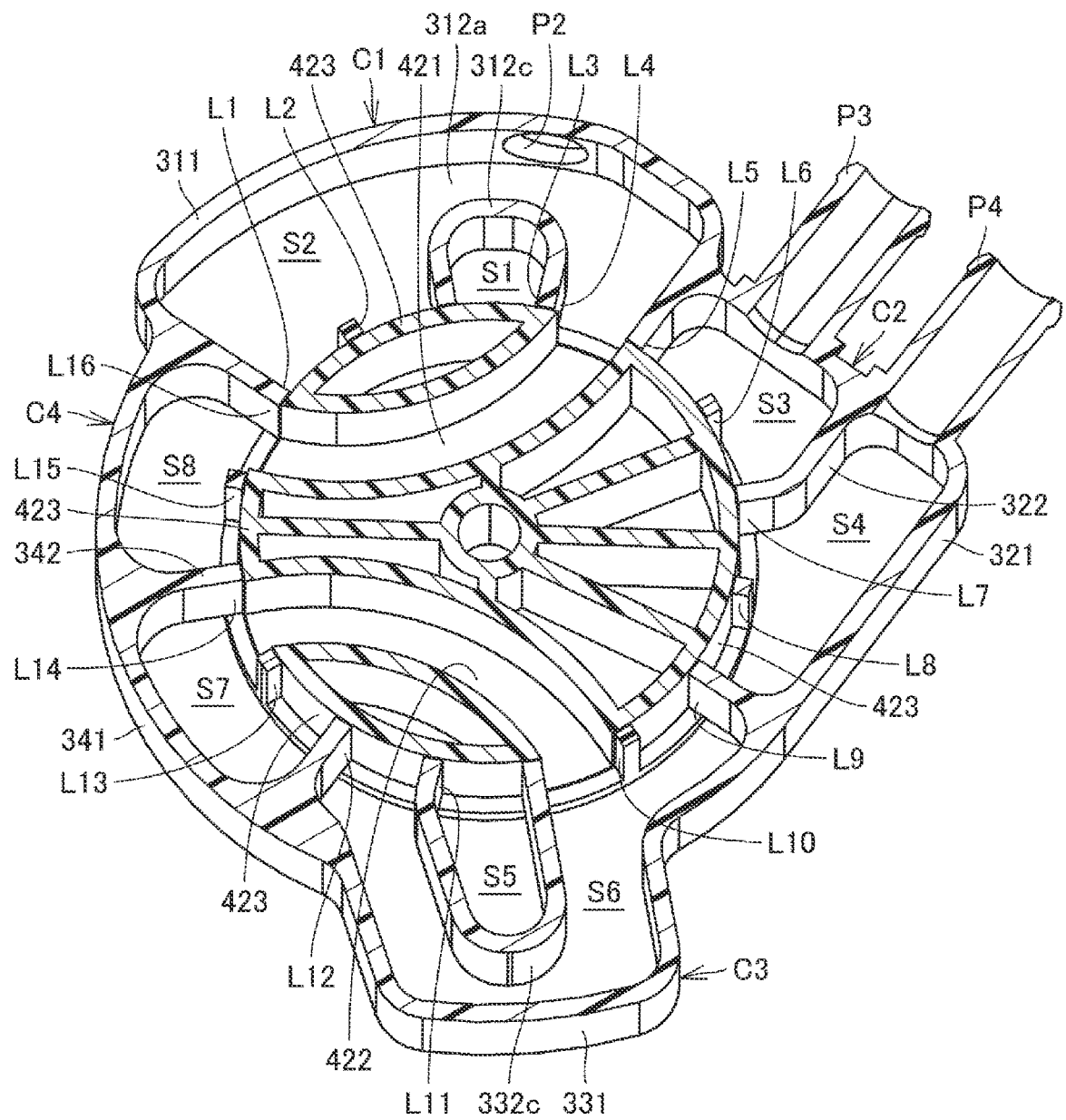
FIG. 7 is a sectional view of the eight-way valve at a lower tier.

As shown in FIG. 3 and FIG. 4, the gasket 500 is provided on an inner side of the annular wall 305. The gasket 500 is formed in a cylindrical shape. The gasket 500 seals a gap between the housing 300 and the rotary member 400. The gasket 500 is provided with through-holes at positions overlapping the 16 upper-tier openings U1 to U16 and the 16 lower-tier openings L1 to L16 in the radial direction. In FIG. 5 to FIG. 7, the gasket 500 is not shown.

The first chamber C1 is provided on an outer side of the annular wall 305 in the radial direction of the annular wall 305. The first upper-tier opening U1 to the fourth upper-tier opening U4 and the first lower-tier opening L1 to the fourth lower-tier opening L4 lead to the first chamber C1.

The second chamber C2 is provided on the outer side of the annular wall 305 in the radial direction, at a position adjacent to the first chamber C1 in the circumferential direction. The fifth upper-tier opening U5 to the eighth upper-tier opening U8 and the fifth lower-tier opening L5 to the eighth lower-tier opening L8 lead to the second chamber C2.

The third chamber C3 is provided on the outer side of the annular wall 305 in the radial direction, at a position adjacent to the second chamber C2 in the circumferential direction. The ninth upper-tier opening U9 to the twelfth upper-tier opening U12 and the ninth lower-tier opening L9 to the twelfth lower-tier opening L12 lead to the third chamber C3.

The fourth chamber C4 is provided on the outer side of the annular wall 305 in the radial direction, at a position adjacent to both of the third chamber C3 and the first chamber C1 in the circumferential direction. The thirteenth upper-tier opening U13 to the sixteenth upper-tier opening U16 and the thirteenth lower-tier opening L13 to the sixteenth lower-tier opening L16 lead to the fourth chamber C4.

The first upper-tier opening U1 to the sixteenth upper-tier opening U16 are disposed so as to be arrayed in a forward direction oriented from the first chamber C1 toward the second chamber C2. The first lower-tier opening L1 to the sixteenth lower-tier opening L16 are also disposed so as to be arrayed along the forward direction.

The first chamber C1 defines a first space S1 and a second space S2 that are separated from each other. Together with the annular wall 305, the first chamber C1 defines the first space S1 and the second space S2. Inside the first chamber C1, the first space S1 and the second space S2 are separated from each other such that the first upper-tier opening U1, the third upper-tier opening U3, the fourth upper-tier opening U4, and the third lower-tier opening L3 lead to the first space S1, and that the second upper-tier opening U2, the first lower-tier opening L1, the second lower-tier opening L2, and the fourth lower-tier opening L4 lead to the second space S2. The first chamber C1 includes a first surrounding wall 311, a first dividing part 312*a*, a second dividing part 312*b*, and a third dividing part 312*c*.

The first surrounding wall 311 collectively surrounds the first upper-tier opening U1 to the fourth upper-tier opening U4 and the first lower-tier opening L1 to the fourth lower-tier opening L4. The first surrounding wall 311 opens upward and downward.

The first dividing part 312*a* divides an inside of the first surrounding wall 311 in an up-down direction. The first dividing part 312*a* is provided between the first upper-tier opening U1 to the fourth upper-tier opening U4 and the first lower-tier opening L1 to the fourth lower-tier opening L4.

The first dividing part 312*a* is disposed in a plane orthogonal to a central axis of the annular wall 305.

The second dividing part 312*b* divides the second space S2 leading to the second upper-tier opening U2 from the first space S1. The second dividing part 312*b* protrudes outward in the radial direction from a portion of the annular wall 305 that defines the second upper-tier opening U2, and has a shape surrounding a region of the second space S2 that is located above the first dividing part 312*a*. The second dividing part 312*b* is spaced from the first surrounding wall 311. The portion of the first dividing part 312*a* that is surrounded by the second dividing part 312*b* is provided with a through-hole h1 (see FIG. 6).

The third dividing part 312*c* divides the first space S1 leading to the third lower-tier opening L3 from the second space S2. The third dividing part 312*c* protrudes outward in the radial direction from a portion of the annular wall 305 that defines the third lower-tier opening L3, and has a shape surrounding a region of the first space S1 that is located under the first dividing part 312*a*. The third dividing part 312*c* is spaced from the first surrounding wall 311. A portion of the first dividing part 312*a* that is surrounded by the third dividing part 312*c* is provided with a through-hole h2 (see FIG. 6).

As shown in FIG. 3 and FIG. 5, a first port P1 is provided at a portion of the first chamber C1 that defines the first space S1, and a second port P2 is provided at a portion of the first chamber C1 that defines the second space S2. In this embodiment, the first port P1 is provided at a portion of the first surrounding wall 311 above the first dividing part 312*a*, and the second port P2 is provided at a portion of the first surrounding wall 311 under the first dividing part 312*a*. As shown in FIG. 2, for example, the first port P1 is connected to a downstream-side end of the second flow passage 130*b*, and the second port P2 is connected to an upstream-side end of the second flow passage 130*b*. Thus, the first port P1 is set as an inlet port through which the heat medium flows in from the battery 138, and the second port P2 is set as an outflow port through which the heat medium flows out toward the battery 138.

The second chamber C2 defines a third space S3 and a fourth space S4 that are separated from each other. Together with the annular wall 305, the second chamber C2 defines the third space S3 and the fourth space S4. Inside the second chamber C2, the third space S3 and the fourth space S4 are separated from each other such that the fifth upper-tier opening U5, the sixth upper-tier opening U6, the fifth lower-tier opening L5, and the sixth lower-tier opening L6 lead to the third space S3, and that the seventh upper-tier opening U7, the eighth upper-tier opening U8, the seventh lower-tier opening L7, and the eighth lower-tier opening L8 lead to the fourth space S4. The second chamber C2 includes a second surrounding wall 321 and a second dividing wall 322.

The second surrounding wall 321 collectively surrounds the fifth upper-tier opening U5 to the eighth upper-tier opening U8 and the fifth lower-tier opening L5 to the eighth lower-tier opening L8. The second surrounding wall 321 opens upward and downward.

The second dividing wall 322 divides an inside of the second surrounding wall 321 in the circumferential direction. The second dividing wall 322 is provided between the fifth upper-tier opening U5, the sixth upper-tier opening U6, the fifth lower-tier opening L5, and the sixth lower-tier opening L6 on one side and the seventh upper-tier opening U7, the eighth upper-tier opening U8, the seventh lower-tier opening L7, and the eighth lower-tier opening L8 on the other side. The second dividing wall 322 is located in a plane parallel to the central axis of the annular wall 305.

As shown in FIG. 3 to FIG. 7, a third port P3 is provided at a portion of the second chamber C2 that defines the third space S3, and a fourth port P4 is provided at a portion of the second chamber C2 that defines the fourth space S4. In this embodiment, the third port P3 is provided at a portion of the second surrounding wall 321 between the second dividing wall 322 and the first chamber C1, and the fourth port P4 is provided at a portion of the second surrounding wall 321 between the second dividing wall 322 and the third chamber C3. As shown in FIG. 2, for example, the third port P3 is connected to a downstream-side end of the first flow passage 130*a*, and the fourth port P4 is connected to an upstream-side end of the first flow passage 130*a*. Thus, the third port P3 is set as an inlet port through which the heat medium having passed through the ESU 132, the PCU 133, the oil cooler 134, and the heater 136 flows in, and the fourth port P4 is set as an outflow port through which the heat medium flows out toward the ESU 132, the PCU 133, the oil cooler 134, and the heater 136.

The third chamber C3 defines a fifth space S5 and a sixth space S6 that are separated from each other. Together with the annular wall 305, the third chamber C3 defines the fifth space S5 and the sixth space S6. Inside the third chamber C3, the fifth space S5 and the sixth space S6 are separated from each other such that the twelfth upper-tier opening U12 and the eleventh lower-tier opening L11 lead to the fifth space S5, and that the ninth upper-tier opening U9, the tenth upper-tier opening U10, the eleventh upper-tier opening U11, the ninth lower-tier opening L9, the tenth lower-tier opening L10, and the twelfth lower-tier opening L12 lead to the sixth space S6. The third chamber C3 includes a third surrounding wall 331, a first dividing part 332*a*, a second dividing part 332*b*, and a third dividing part 332*c*.

The third surrounding wall 331 collectively surrounds the ninth upper-tier opening U9 to the twelfth upper-tier opening U12 and the ninth lower-tier opening L9 to the twelfth lower-tier opening L12. The third surrounding wall 331 opens upward and downward.

As shown in FIG. 4 and FIG. 7, the third dividing part 332*c* divides the fifth space S5 leading to the eleventh lower-tier opening L11 from the sixth space S6. The third dividing part 332*c* protrudes outward in the radial direction from a portion of the annular wall 305 that defines the eleventh lower-tier opening L11, and has a shape surrounding a region of the fifth space S5 that is located under the first dividing part 332*a*. The third dividing part 332*c* is spaced from the third surrounding wall 331.

The first dividing part 332*a* divides an inside of the third surrounding wall 331 in the up-down direction. The first dividing part 332*a* is provided between the ninth upper-tier opening U9 to the twelfth upper-tier opening U12 and the ninth lower-tier opening L9 to the twelfth lower-tier opening L12. The first dividing part 332*a* is located in a plane orthogonal to the central axis of the annular wall 305.

The second dividing part 332*b* divides the fifth space S5 leading to the twelfth upper-tier opening U12 from the sixth space S6. The second dividing part 332*b* protrudes outward in the radial direction from a portion of the annular wall 305 that defines the twelfth upper-tier opening U12, and has a shape surrounding a region of the fifth space S5 that is located above the first dividing part 332*a*. The second dividing part 332*b* leads to the third surrounding wall 331. As shown in FIG. 5 and FIG. 6, the first dividing part 332*a* is provided with a through-hole h5 that allows communication between a space surrounded by the second dividing part 332b and a space surrounded by the third dividing part 332c, and a through-hole h6 that allows communication at least either between the ninth upper-tier opening U9 and the ninth lower-tier opening L9 or between the tenth upper-tier opening U10 and the tenth lower-tier opening L10.

As shown in FIG. 3 and FIG. 4, a fifth port P5 is provided at a portion of the third chamber C3 that defines the fifth space S5, and a sixth port P6 is provided at a portion of the third chamber C3 that defines the sixth space S6. In this embodiment, the fifth port P5 and the sixth port P6 are provided in a lower cover 303. As shown in FIG. 2, for example, the fifth port P5 is connected to a downstream-side end of the fourth flow passage 130d and the sixth port P6 is connected to an upstream-side end of the fourth flow passage 130d. Thus, the fifth port P5 is set as an inlet port through which the heat medium having passed through the low-temperature radiator 122 flows in, and the sixth port P6 is set as an outflow port through which the heat medium flows out toward the low-temperature radiator 122.

The fourth chamber C4 defines a seventh space S7 and an eighth space S8 that are separated from each other. Together with the annular wall 305, the fourth chamber C4 defines the seventh space S7 and the eighth space S8. Inside the fourth chamber C4, the seventh space S7 and the eighth space S8 are separated from each other such that the thirteenth upper-tier opening U13, the fourteenth upper-tier opening U14, the thirteenth lower-tier opening L13, and the fourteenth lower-tier opening L14 lead to the seventh space S7, and that the fifteenth upper-tier opening U15, the sixteenth upper-tier opening U16, the fifteenth lower-tier opening L15, and the sixteenth lower-tier opening L16 lead to the eighth space S8. The fourth chamber C4 includes a fourth surrounding wall 341 and a fourth dividing wall 342.

The fourth surrounding wall 341 collectively surrounds the thirteenth upper-tier opening U13 to the sixteenth upper-tier opening U16 and the thirteenth lower-tier opening L13 to the sixteenth lower-tier opening L16. The fourth surrounding wall 341 opens upward and downward.

The fourth dividing wall 342 divides an inside of the fourth surrounding wall 341 in the circumferential direction. The fourth dividing wall 342 is provided between the thirteenth upper-tier opening U13, the fourteenth upper-tier opening U14, the thirteenth lower-tier opening L13, and the fourteenth lower-tier opening L14 on one side and the fifteenth upper-tier opening U15, the sixteenth upper-tier opening U16, the fifteenth lower-tier opening L15, and the sixteenth lower-tier opening L16 on the other side. The fourth dividing wall 342 is located in a plane parallel to the central axis of the annular wall 305.

As shown in FIG. 3 and FIG. 4, a seventh port P7 is provided at a portion of the fourth chamber C4 that defines the seventh space S7, and an eighth port P8 is provided at a portion of the fourth chamber C4 that defines the eighth space S8. In this embodiment, the seventh port P7 and the eighth port P8 are provided in an upper cover 302. As shown in FIG. 2, for example, the seventh port P7 is connected to a downstream-side end of the third flow passage 130c and the eighth port P8 is connected to an upstream-side end of the third flow passage 130c. Thus, the seventh port P7 is set as an inlet port through which the heat medium having passed through the chiller 160 flows in, and the eighth port P8 is set as an outflow port through which the heat medium flows out toward the chiller 160.

In this embodiment, the housing 300 includes a housing main body 301, the upper cover 302, and the lower cover 303.

The housing main body 301 includes the annular wall 305, the first surrounding wall 311, the first dividing part 312a, the second dividing part 312b, the third dividing part 312c, the second surrounding wall 321, the second dividing wall 322, the third surrounding wall 331, the first dividing part 332a, the second dividing part 332b, the third dividing part 332c, the fourth surrounding wall 341, and the fourth dividing wall 342.

The upper cover 302 is connected to the housing main body 301 so as to close an upper opening of each of the surrounding walls 311 to 341. As shown in FIG. 3 and FIG. 4, the upper cover 302 is provided with the seventh port P7 and the eighth port P8.

The lower cover 303 is connected to the housing main body 301 so as to close a lower opening of each of the surrounding walls 311 to 341. As shown in FIG. 3 and FIG. 4, the fifth port P5 and the sixth port P6 are provided in the lower cover 303.

The rotary member 400 is disposed inside the housing 300 and can rotate relative to the housing 300. The rotary member 400 is disposed inside the gasket 500. The rotary member 400 includes an upper-tier switching part 410 and a lower-tier switching part 420.

The upper-tier switching part 410 switches between opening and closing of each of the 16 upper-tier openings U1 to U16. As shown in FIG. 5, the upper-tier switching part 410 includes an upper-tier first communication passage 411, an upper-tier second communication passage 412, and an upper-tier closing part 413.

The upper-tier first communication passage 411 allows communication between one upper-tier opening among the 16 upper-tier openings U1 to U16 and an upper-tier opening that is located at the fourth position from the aforementioned one upper-tier opening toward the one side in the circumferential direction (along the forward direction). In the example shown in FIG. 5, the upper-tier first communication passage 411 allows communication between the eighth upper-tier opening U8 and the twelfth upper-tier opening U12.

The upper-tier second communication passage 412 allows communication between an upper-tier opening that is located at the tenth position from the aforementioned one upper-tier opening toward the one side in the circumferential direction and an upper-tier opening that is located at the 14th position from the aforementioned one upper-tier opening toward the one side in the circumferential direction. In the example shown in FIG. 5, the upper-tier second communication passage 412 allows communication between the second upper-tier opening U2 and the sixth upper-tier opening U6.

The upper-tier closing part 413 closes the 12 upper-tier openings among the 16 upper-tier openings U1 to U16 other than the four upper-tier openings between which the upper-tier first communication passage 411 and the upper-tier second communication passage 412 allow communication. In the example shown in FIG. 5, the upper-tier closing part 413 closes the first upper-tier opening U1, the third upper-tier opening U3 to the fifth upper-tier opening U5, the seventh upper-tier opening U7, the ninth upper-tier opening U9 to the eleventh upper-tier opening U11, and the thirteenth upper-tier opening U13 to the sixteenth upper-tier opening U16. The upper-tier closing part 413 is curved so as to be convex outward in the radial direction.

The lower-tier switching part 420 switches between opening and closing of each of the 16 lower-tier openings L1 to L16. As shown in FIG. 7, the lower-tier switching part 420 includes a lower-tier first communication passage 421, a lower-tier second communication passage 422, and a lower-tier closing part 423.

The lower-tier first communication passage 421 allows communication between one lower-tier opening among the 16 lower-tier openings L1 to L16 and a lower-tier opening that is located at the fourth position from the aforementioned one lower-tier opening toward the one side in the circumferential direction (along the forward direction). Among the 16 lower-tier openings L1 to L16, the aforementioned one lower-tier opening is located under an upper-tier opening that is located at the eighth position from the aforementioned one upper-tier opening toward the one side in the circumferential direction. In the example shown in FIG. 7, the lower-tier first communication passage 421 allows communication between the sixteenth lower-tier opening L16 and the fourth lower-tier opening L4.

The lower-tier second communication passage 422 allows communication between a lower-tier opening that is located at the tenth position from the aforementioned one lower-tier opening toward the one side in the circumferential direction and a lower-tier opening that is located at the 14th position from the aforementioned one lower-tier opening toward the one side in the circumferential direction. In the example shown in FIG. 7, the lower-tier second communication passage 422 allows communication between the tenth lower-tier opening L10 and the fourteenth lower-tier opening L14.

The lower-tier closing part 423 closes the 12 lower-tier openings among the 16 lower-tier openings L1 to L16 other than the four lower-tier openings between which the lower-tier first communication passage 421 and the lower-tier second communication passage 422 allow communication. In the example shown in FIG. 7, the lower-tier closing part 423 closes the first lower-tier opening L1 to the third lower-tier opening L3, the fifth lower-tier opening L5 to the ninth lower-tier opening L9, the eleventh lower-tier opening L11 to the thirteenth lower-tier opening L13, and the fifteenth lower-tier opening L15. The lower-tier closing part 423 is curved so as to be convex outward in the radial direction.

Next, a plurality of modes in the heat management circuit 100 that is formed as the eight-way valve V is switched will be described. Switching of the eight-way valve V is performed by a control unit (an ECU etc.; not shown).

Figure 8:
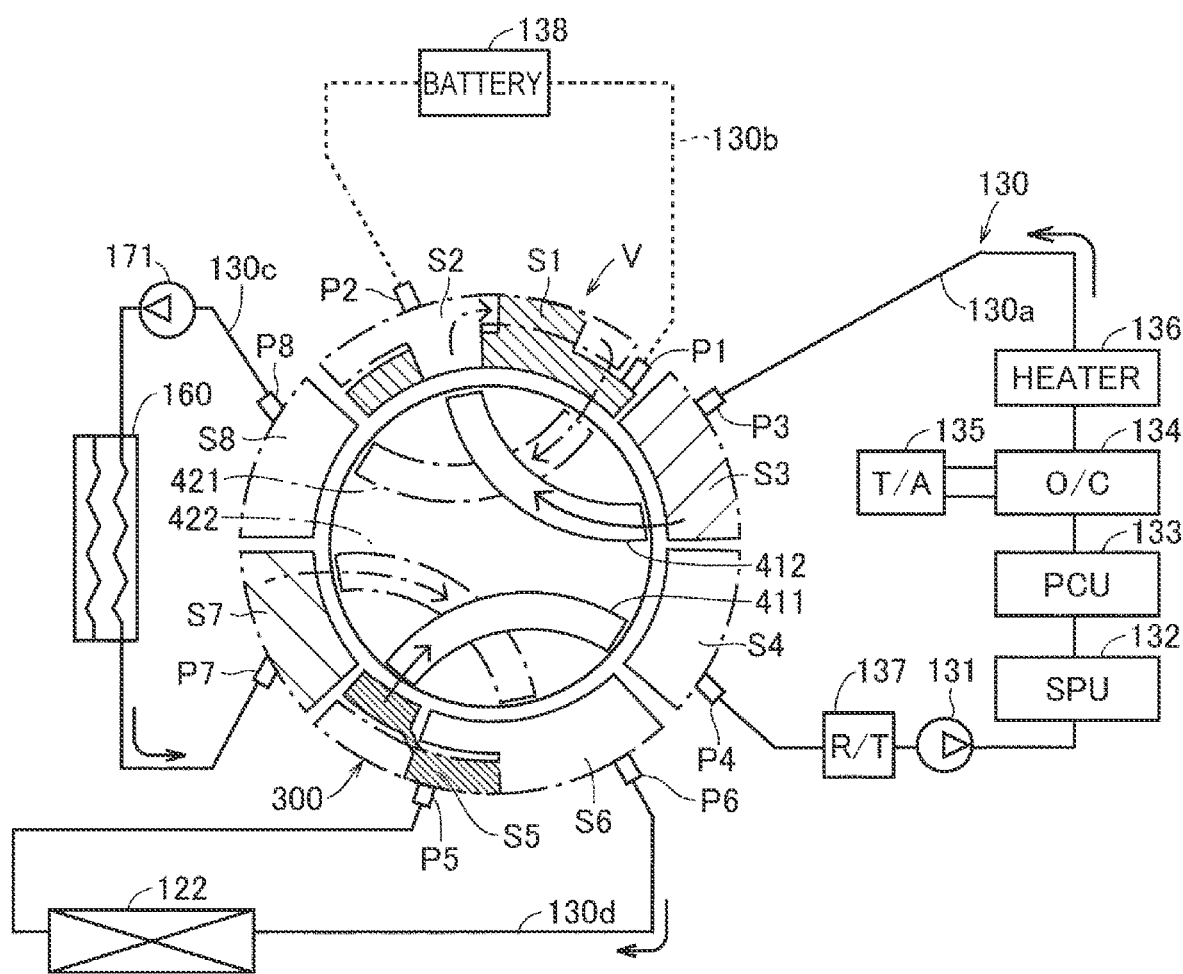
FIG. 8 is a diagram schematically showing a first mode of the low-temperature circuit shown in FIG. 2.

Next, a first mode of the low-temperature circuit will be described. FIG. 8 schematically shows the first mode of the low-temperature circuit 130 including the eight-way valve V. In FIG. 8, upper-tier regions of the spaces S1 to S8 that overlap the upper-tier openings in the radial direction are schematically indicated by solid lines in the housing 300, on the inner side in the radial direction, and lower-tier regions of the spaces S1 to S8 that overlap the lower-tier openings in the radial direction are schematically indicated by long dashed short dashed lines in the housing 300, on the outer side of the upper-tier regions in the radial direction. The upper-tier first communication passage 411 and the upper-tier second communication passage 412 are indicated by solid lines, and the lower-tier first communication passage 421 and the lower-tier second communication passage 422 are indicated by long dashed short dashed lines. The first space S1, the third space S3, the fifth space S5, and the seventh space S7 are indicated by hatching. The same applies to FIG. 9 to FIG. 14.

In the first mode, the upper-tier first communication passage 411 couples the eighth upper-tier opening U8 and the twelfth upper-tier opening U12 to each other; the upper-tier second communication passage 412 couples the second upper-tier opening U2 and the sixth upper-tier opening U6 to each other; the lower-tier first communication passage 421 couples the fourth lower-tier opening L4 and the sixteenth lower-tier opening L16 to each other; and the lower-tier second communication passage 422 couples the tenth lower-tier opening L10 and the fourteenth lower-tier opening L14 to each other.

In the first mode, the heat medium having flowed out from the fourth space S4 to the first flow passage 130a through the fourth port P4 absorbs heat from the PCU 133 etc. and then flows into the third space S3 through the third port P3. In this mode, since the fifth upper-tier opening U5 is closed by the upper-tier closing part 413 and the fifth lower-tier opening L5 and the sixth lower-tier opening L6 are closed by the lower-tier closing part 423, the heat medium having flowed into the third space S3 flows into the second space S2 through the upper-tier second communication passage 412.

The heat medium having flowed into the second space S2 flows into the lower region of the housing 300 through the through-hole h1. Here, since the first lower-tier opening L1 and the second lower-tier opening L2 are closed by the lower-tier closing part 423, the heat medium having flowed into the lower-tier region of the second space S2 flows into the eighth space S8 through the lower-tier first communication passage 421. Since the openings (the first upper-tier opening U1, the third upper-tier opening U3, the fourth upper-tier opening U4, and the third lower-tier opening L3) leading to the first space S1 are closed by the upper-tier closing part 413 and the lower-tier closing part 423, the heat medium having flowed into the lower-tier region of the second space S2 does not flow out to the second flow passage 130b through the second port P2.

Since the fifteenth upper-tier opening U15 and the sixteenth upper-tier opening U16 leading to the eighth space S8 are closed by the upper-tier closing part 413 and the fifteenth lower-tier opening L15 leading to the eighth space S8 is closed by the lower-tier closing part 423, the heat medium having flowed into the eighth space S8 flows out to the third flow passage 130c through the eighth port P8. This heat medium exchanges heat with the working medium flowing through the chiller 160 and then flows into the seventh space S7 through the seventh port P7.

Since the thirteenth upper-tier opening U13 and the fourteenth upper-tier opening U14 leading to the seventh space S7 are closed by the upper-tier closing part 413 and the thirteenth lower-tier opening L13 leading to the seventh space S7 is closed by the lower-tier closing part 423, the heat medium having flowed into the seventh space S7 flows into the sixth space S6 through the lower-tier second communication passage 422.

Since the ninth upper-tier opening U9 to the eleventh upper-tier opening U11 leading to the sixth space S6 are closed by the upper-tier closing part 413 and the ninth lower-tier opening L9 and the twelfth lower-tier opening L12 leading to the sixth space S6 are closed by the lower-tier closing part 423, the heat medium having flowed into the sixth space S6 flows out to the fourth flow passage 130d through the sixth port P6. The heat medium exchanges heat with the low-temperature radiator 122 and then flows into the fifth space S5 through the fifth port P5.

Since the eleventh lower-tier opening L11 leading to the fifth space S5 is closed by the lower-tier closing part 423, the heat medium having flowed into the fifth space S5 flows into the upper-tier region of the fifth space S5 through the through-hole h5 and flows into the fourth space S4 through the upper-tier first communication passage 411.

As has been described above, in the first mode, a circuit in which the heat medium circulates among the PCU 133 etc., the chiller 160, and the low-temperature radiator 122 in this order is formed, while the battery 138 is cut off from this circuit.

In the following, functions of the first mode of the low-temperature circuit will be described. In the first mode, waste heat of the PCU 133 etc. and heat generated in the PCU 133 etc. by reducing the operation efficiency of the PCU 133 etc. (produced heat) can be used to heat the vehicle cabin in the electrified vehicle 1*a*. Further, since the battery 138 is cut off from the circuit, cooling of the battery 138 due to the heat medium flowing through the circuit is mitigated, for example, during temperature rise of the battery 138 including self-heating of the battery 138. Extra heat generated in the PCU 133 etc. is released to outside air in the low-temperature radiator 122. When frost is formed on the low-temperature radiator 122, it is also possible to use the heat recovered in the PCU 133 etc. to defrost the low-temperature radiator 122. In addition, it is also possible to supply the heat recovered in the low-temperature radiator 122 to the chiller 160 (outside-air heat pump).

Figure 9:
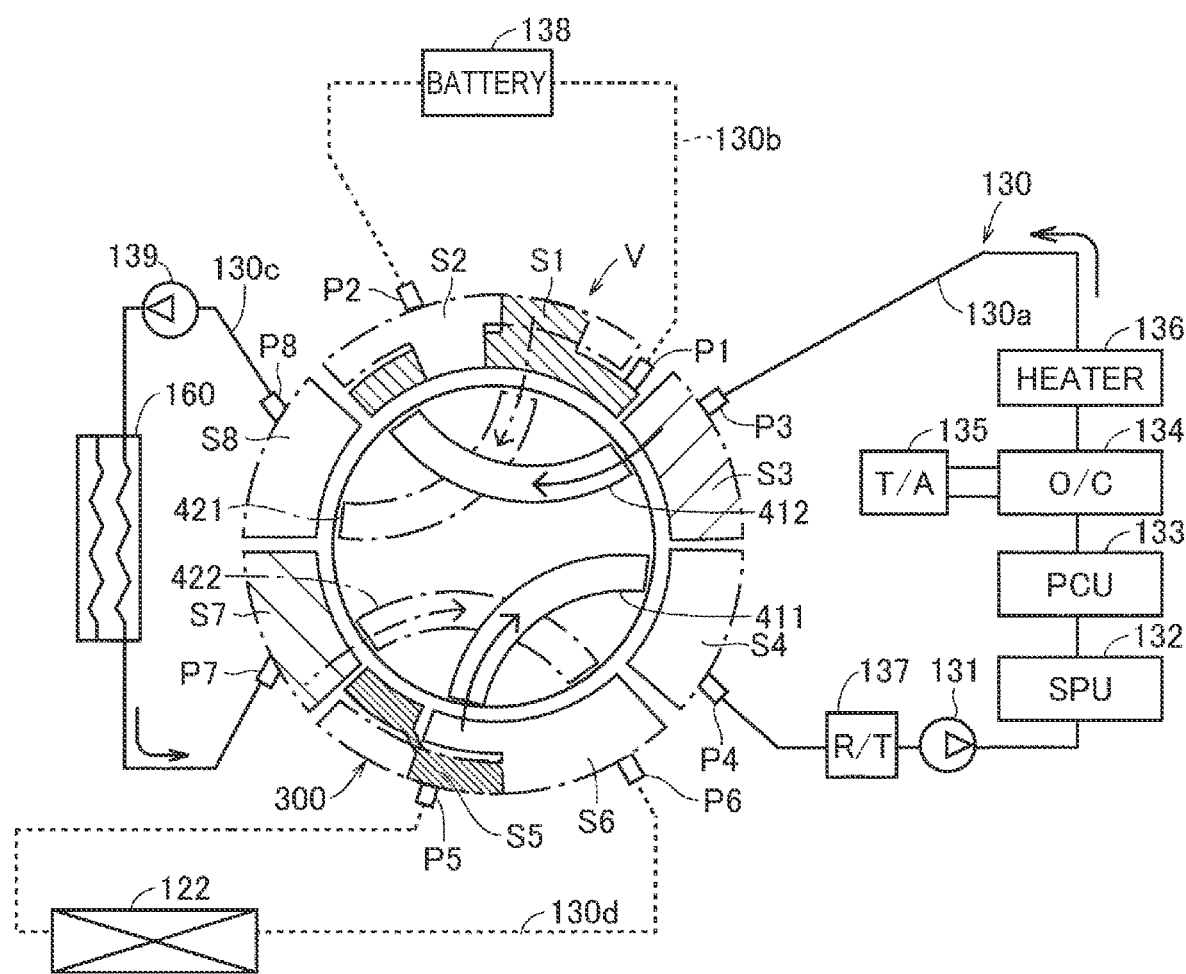
FIG. 9 is a diagram schematically showing a second mode of the low-temperature circuit.

Next, a second mode of the low-temperature circuit will be described. FIG. 9 schematically shows the second mode of the low-temperature circuit 130 including the eight-way valve V. In the second mode, the upper-tier first communication passage 411 couples the seventh upper-tier opening U7 and the eleventh upper-tier opening U11 to each other; the upper-tier second communication passage 412 couples the first upper-tier opening U1 and the fifth upper-tier opening U5 to each other; the lower-tier first communication passage 421 couples the third lower-tier opening L3 and the fifteenth lower-tier opening L15 to each other; and the lower-tier second communication passage 422 couples the ninth lower-tier opening L9 and the thirteenth lower-tier opening L13 to each other.

In the second mode, a circuit in which the heat medium circulates between the PCU 133 etc. and the chiller 160 is formed, while the battery 138 and the low-temperature radiator 122 are cut off from this circuit. This second mode is different from the first mode in that the low-temperature radiator 122 in addition to the battery 138 is cut off; therefore, of the functions that can be realized in the first mode, those relating to the low-temperature radiator 122 are omitted.

Figure 10:
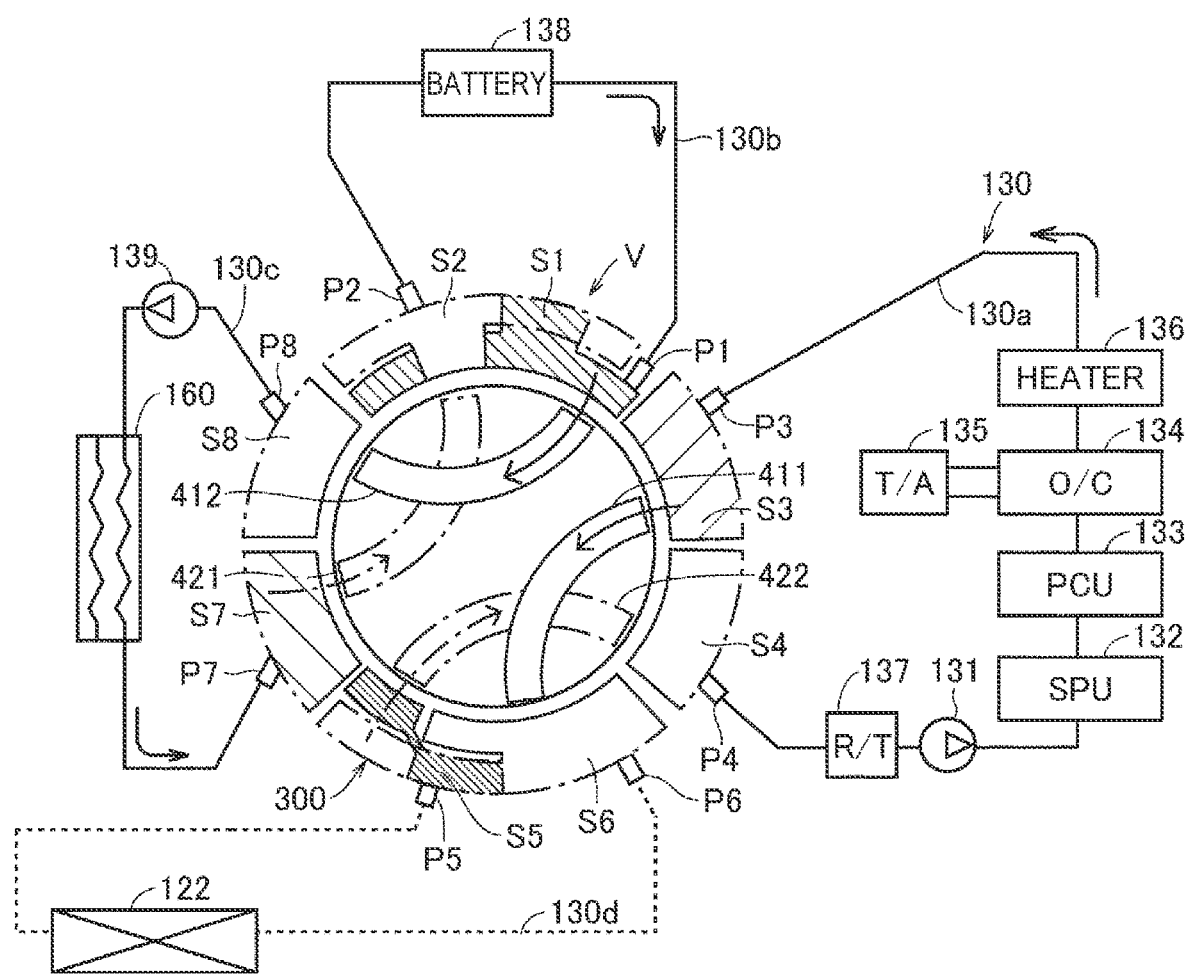
FIG. 10 is a diagram schematically showing a third mode of the low-temperature circuit.

Next, a third mode of the low-temperature circuit will be described. FIG. 10 schematically shows the third mode of the low-temperature circuit 130 including the eight-way valve V. In the third mode, the upper-tier first communication passage 411 couples the sixth upper-tier opening U6 and the tenth upper-tier opening U10 to each other; the upper-tier second communication passage 412 couples the fourth upper-tier opening U4 and the sixteenth upper-tier opening U16 to each other; the lower-tier first communication passage 421 couples the second lower-tier opening L2 and the fourteenth lower-tier opening L14 to each other; and the lower-tier second communication passage 422 couples the eighth lower-tier opening L8 and the twelfth lower-tier opening L12 to each other.

In the third mode, a first circuit in which the heat medium circulates between the PCU 133 etc. and the eight-way valve V and a second circuit in which the heat medium circulates between the battery 138 and the chiller 160 are formed, while the low-temperature radiator 122 is cut off from these circuits. In this third mode, in the first circuit, waste heat of the PCU 133 etc. is accumulated in the heat medium, while in the second circuit, heat generated in the battery 138 is released in the chiller 160. Further, heat radiation in the low-temperature radiator 122 is reduced.

Figure 11:
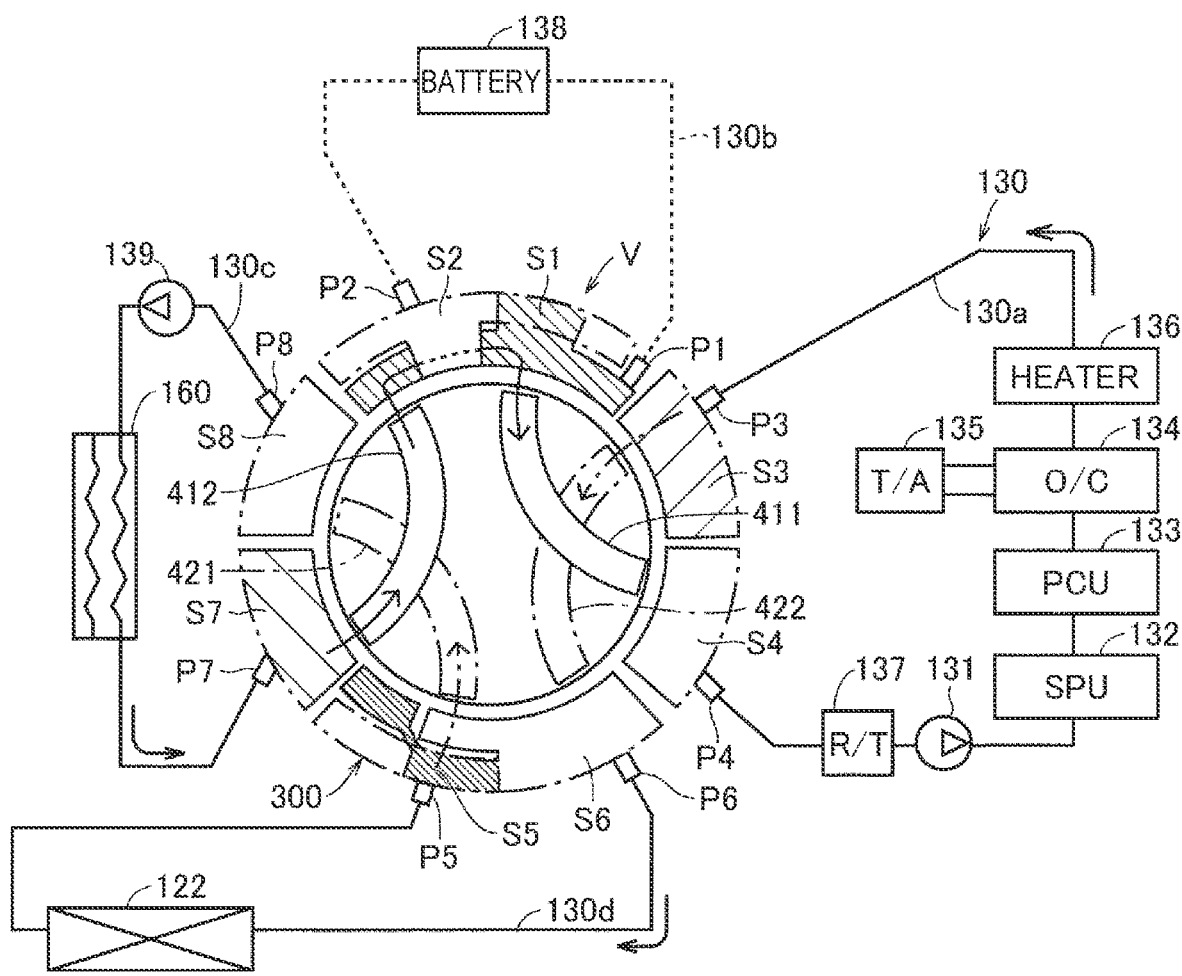
FIG. 11 is a diagram schematically showing a fourth mode of the low-temperature circuit.

Next, a fourth mode of the low-temperature circuit will be described. FIG. 11 schematically shows the fourth mode of the low-temperature circuit 130 including the eight-way valve V. In the fourth mode, the upper-tier first communication passage 411 couples the third upper-tier opening U3 and the seventh upper-tier opening U7 to each other; the upper-tier second communication passage 412 couples the first upper-tier opening U1 and the thirteenth upper-tier opening U13 to each other; the lower-tier first communication passage 421 couples the eleventh lower-tier opening L11 and the fifteenth lower-tier opening L15 to each other; and the lower-tier second communication passage 422 couples the fifth lower-tier opening L5 and the ninth lower-tier opening L9 to each other.

In the fourth mode, a circuit in which the heat medium circulates among the PCU 133 etc., the low-temperature radiator 122, and the chiller 160 is formed, while the battery 138 is cut off from this circuit. In this fourth mode, the circulation direction of the heat medium in the circuit is opposite from that in the first mode. Functions that can be realized in the fourth mode are substantially the same as the functions that can be realized in the first mode.

Figure 12:
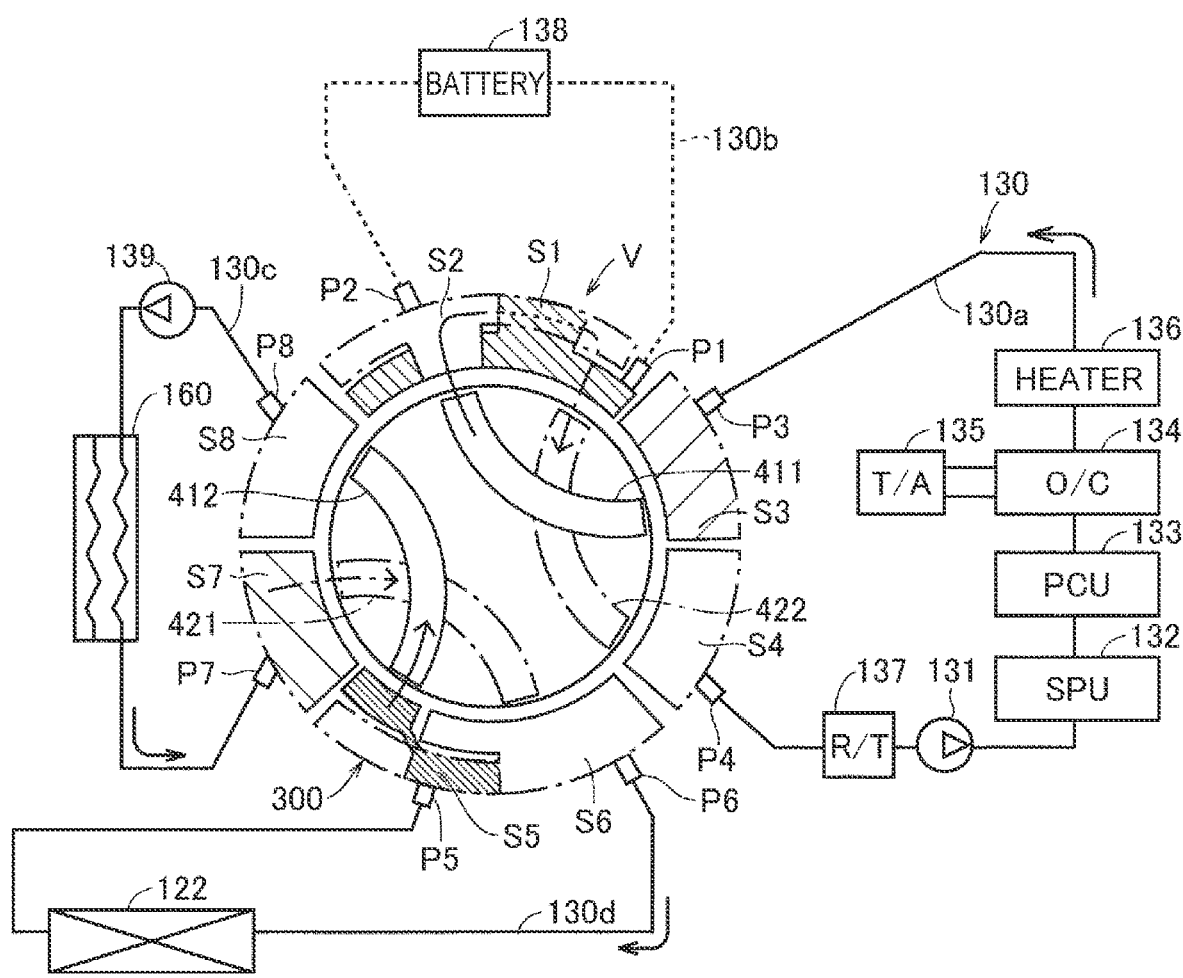
FIG. 12 is a diagram schematically showing a fifth mode of the low-temperature circuit.

Next, a fifth mode of the low-temperature circuit will be described. FIG. 12 schematically shows the fifth mode of the low-temperature circuit 130 including the eight-way valve V. In the fifth mode, the upper-tier first communication passage 411 couples the second upper-tier opening U2 and the sixth upper-tier opening U6 to each other; the upper-tier second communication passage 412 couples the twelfth upper-tier opening U12 and the sixteenth upper-tier opening U16 to each other; the lower-tier first communication passage 421 couples the tenth lower-tier opening L10 and the fourteenth lower-tier opening L14 to each other; and the lower-tier second communication passage 422 couples the fourth lower-tier opening L4 and the eighth lower-tier opening L8 to each other.

In the fifth mode, a first circuit in which the heat medium circulates between the PCU 133 etc. and the eight-way valve V and a second circuit in which the heat medium circulates between the chiller 160 and the low-temperature radiator 122 are formed, while the battery 138 is cut off from these circuits. In this fifth mode, in the first circuit, waste heat of the PCU 133 etc. is accumulated in the heat medium, while in the second circuit, heat recovered in the low-temperature radiator 122 can be supplied to the chiller 160 (outside-air heat pump). In addition, cooling of the battery 138 due to the heat medium is mitigated, for example, during temperature rise of the battery 138 including self-heating of the battery 138.

Figure 13:
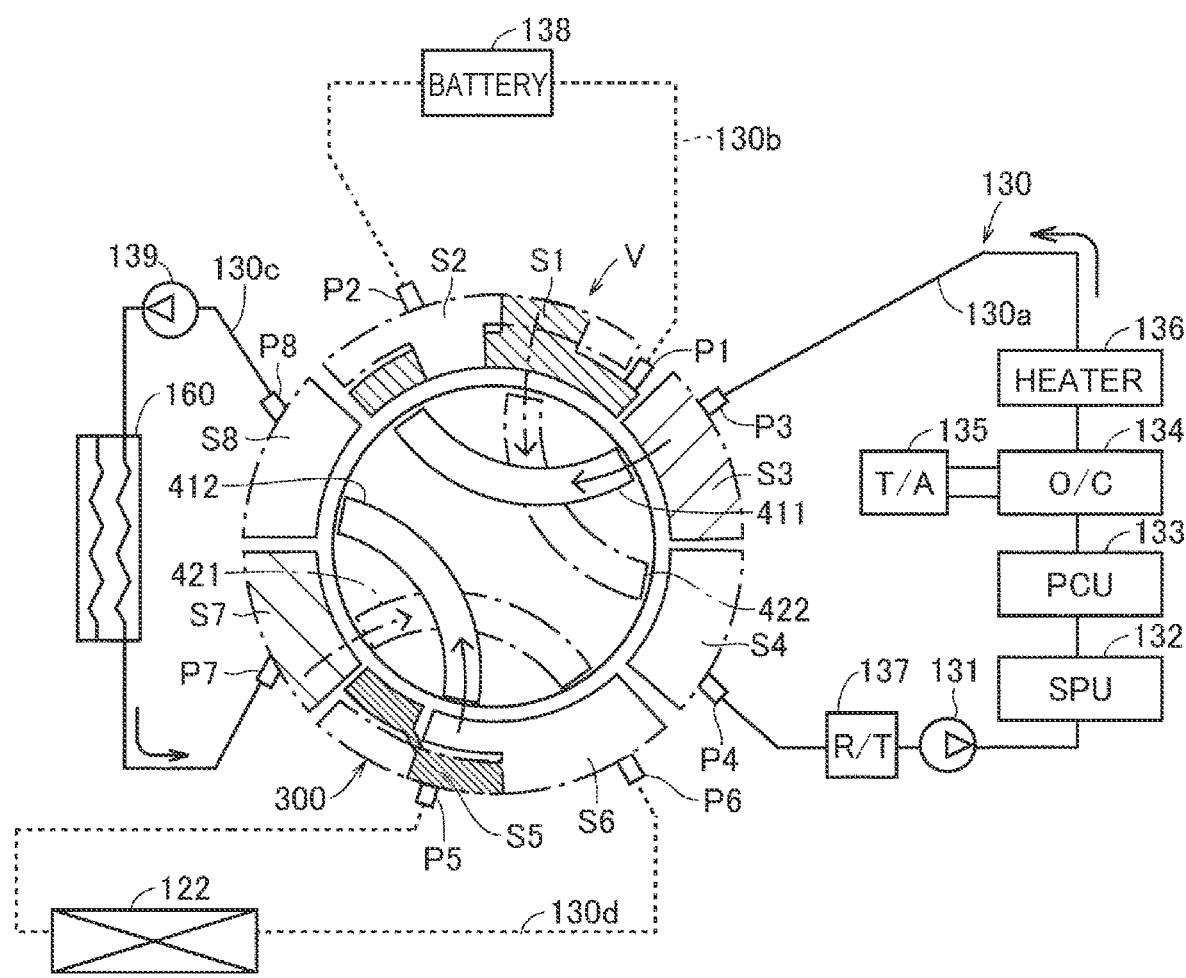
FIG. 13 is a diagram schematically showing a sixth mode of the low-temperature circuit.

Next, a sixth mode of the low-temperature circuit will be described. FIG. 13 schematically shows the sixth mode of the low-temperature circuit 130 including the eight-way valve V. In the sixth mode, the upper-tier first communication passage 411 couples the first upper-tier opening U1 and the fifth upper-tier opening U5 to each other; the upper-tier second communication passage 412 couples the eleventh upper-tier opening U11 and the fifteenth upper-tier opening U15 to each other; the lower-tier first communication passage 421 couples the ninth lower-tier opening L9 and the thirteenth lower-tier opening L13 to each other; and the lower-tier second communication passage 422 couples the third lower-tier opening L3 and the seventh lower-tier opening L7 to each other.

In the sixth mode, a first circuit in which the heat medium circulates between the PCU 133 etc. and the eight-way valve V and a second circuit in which the heat medium circulates between the chiller 160 and the eight-way valve V are formed, while the battery 138 and the low-temperature radiator 122 are cut off from these circuits. In this sixth mode, in the first circuit, waste heat of the PCU 133 etc. is accumulated in the heat medium, and cooling of the battery 138 due to the heat medium is mitigated, for example, during temperature rise of the battery 138 including self-heating of the battery 138. In the sixth mode, the second water pump 139 may be stopped.

Figure 14:
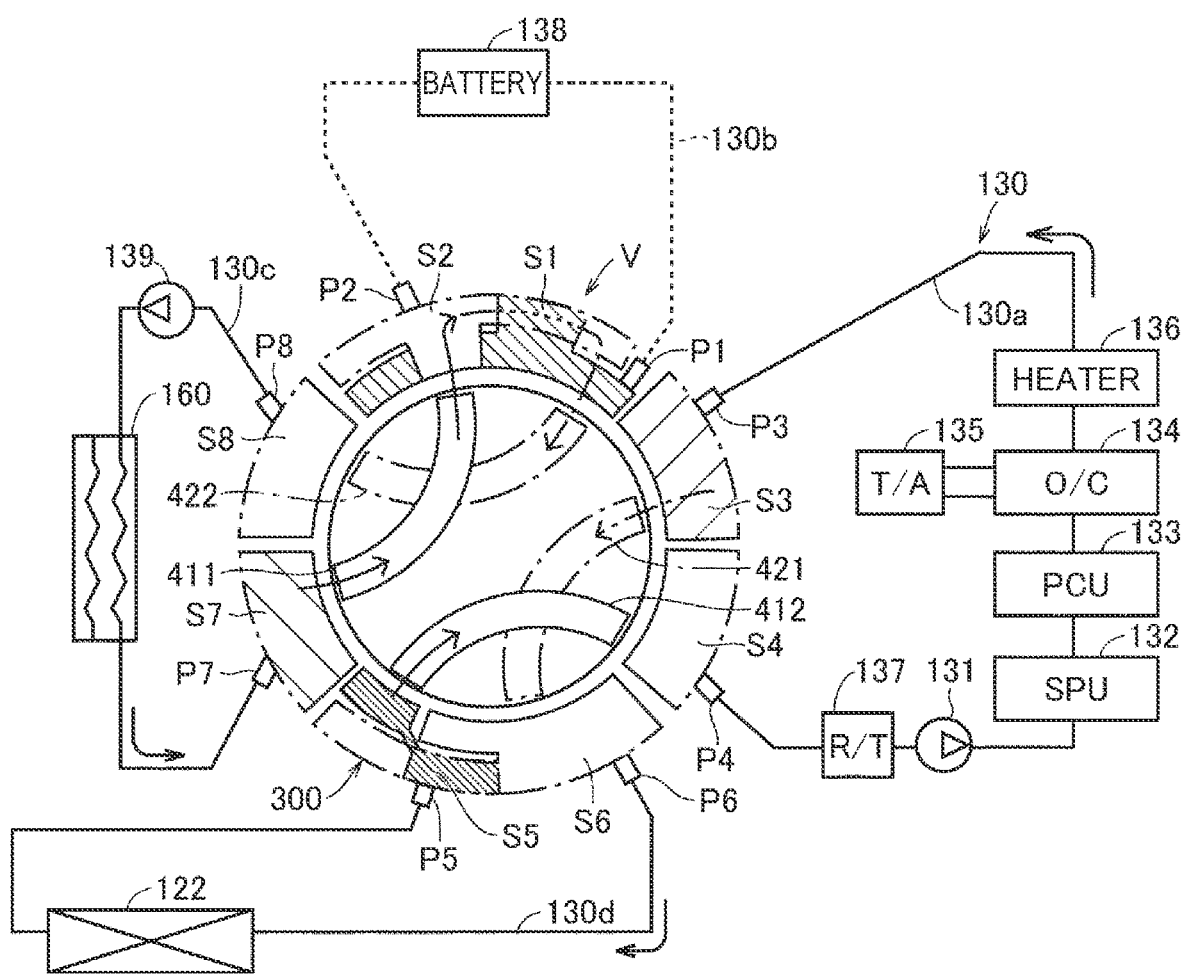
FIG. 14 is a diagram schematically showing a seventh mode of the low-temperature circuit.

Next, a seventh mode of the low-temperature circuit will be described. FIG. 14 schematically shows the seventh mode of the low-temperature circuit 130 including the eight-way valve V. In the seventh mode, the upper-tier first communication passage 411 couples the second upper-tier opening U2 and the fourteenth upper-tier opening U14 to each other; the upper-tier second communication passage 412 couples the eighth upper-tier opening U8 and the twelfth upper-tier opening U12 to each other; the lower-tier first communication passage 421 couples the sixth lower-tier opening L6 and the tenth lower-tier opening L10 to each other; and the lower-tier second communication passage 422 couples the fourth lower-tier opening L4 and the sixteenth lower-tier opening L16 to each other.

In the seventh mode, a first circuit in which the heat medium circulates between the PCU 133 etc. and the low-temperature radiator 122 and a second circuit in which the heat medium circulates between the chiller 160 and the eight-way valve V are formed, while the battery 138 is cut off from these circuits. In this seventh mode, in the first circuit, waste heat of the PCU 133 etc. is released in the low-temperature radiator 122, and cooling of the battery 138 due to the heat medium is mitigated, for example, during temperature rise of the battery 138 including self-heating of the battery 138. In the seventh mode, the second water pump 139 may be stopped.

Here, other modes of the low-temperature circuit will be described. While this is not shown, the eight-way valve V can also switch the heat management circuit 100 to other modes than the above-described seven modes. As such modes, for example, the following six modes from an eighth mode to a thirteenth mode will be described without their being shown in the drawings.

Next, the eighth mode of the low-temperature circuit will be described. In the eighth mode, the upper-tier first communication passage 411 couples the tenth upper-tier opening U10 and the fourteenth upper-tier opening U14 to each other; the upper-tier second communication passage 412 couples the fourth upper-tier opening U4 and the eighth upper-tier opening U8 to each other; the lower-tier first communication passage 421 couples the second lower-tier opening L2 and the sixth lower-tier opening L6 to each other; and the lower-tier second communication passage 422 couples the twelfth lower-tier opening L12 and the sixteenth lower-tier opening L16 to each other. In the eighth mode, a circuit in which the heat medium circulates between the PCU 133 etc. and the battery 138 and a circuit in which the heat medium circulates between the chiller 160 and the eight-way valve V are formed, while the low-temperature radiator 122 is cut off from these circuits.

Next, a ninth mode of the low-temperature circuit will be described. In the ninth mode, the upper-tier first communication passage 411 couples the ninth upper-tier opening U9 and the thirteenth upper-tier opening U13 to each other; the upper-tier second communication passage 412 couples the third upper-tier opening U3 and the seventh upper-tier opening U7 to each other; the lower-tier first communication passage 421 couples the first lower-tier opening L1 and the fifth lower-tier opening L5 to each other; and the lower-tier second communication passage 422 couples the eleventh lower-tier opening L11 and the fifteenth lower-tier opening L15 to each other. In the ninth mode, a circuit in which the heat medium circulates between the PCU 133 etc. and the battery 138 and a circuit in which the heat medium circulates between the chiller 160 and the low-temperature radiator 122 are formed.

Next, a tenth mode of the low-temperature circuit will be described. In the tenth mode, the upper-tier first communication passage 411 couples the fifth upper-tier opening U5 and the ninth upper-tier opening U9 to each other; the upper-tier second communication passage 412 couples the third upper-tier opening U3 and the fifteenth upper-tier opening U15 to each other; the lower-tier first communication passage 421 couples the thirteenth lower-tier opening L13 and the sixteenth lower-tier opening L16 to each other; and the lower-tier second communication passage 422 couples the seventh lower-tier opening L7 and the eleventh lower-tier opening L11 to each other. In the tenth mode, a circuit in which the heat medium circulates between the PCU 133 etc. and the low-temperature radiator 122 and a circuit in which the heat medium circulates between the battery 138 and the chiller 160 are formed.

Next, the eleventh mode of the low-temperature circuit will be described. In the eleventh mode, the upper-tier first communication passage 411 couples the fourth upper-tier opening U4 and the eighth upper-tier opening U8 to each other; the upper-tier second communication passage 412 couples the second upper-tier opening U2 and the fourteenth upper-tier opening U14 to each other; the lower-tier first communication passage 421 couples the twelfth lower-tier opening L12 and the sixteenth lower-tier opening L16 to each other; and the lower-tier second communication passage 422 couples the sixth lower-tier opening L6 and the tenth lower-tier opening L10 to each other. In the eleventh mode, a circuit in which the heat medium circulates among the PCU 133 etc., the chiller 160, and the battery 138 in this order is formed, while the low-temperature radiator 122 is cut off from this circuit.

Next, the twelfth mode of the low-temperature circuit will be described. In the twelfth mode, the upper-tier first communication passage 411 couples the fourth upper-tier opening U4 and the sixteenth upper-tier opening U16 to each other; the upper-tier second communication passage 412 couples the tenth upper-tier opening U10 and the fourteenth upper-tier opening U14 to each other; the lower-tier first communication passage 421 couples the eighth lower-tier opening L8 and the twelfth lower-tier opening L12 to each other; and the lower-tier second communication passage 422 couples the second lower-tier opening L2 and the sixth lower-tier opening L6 to each other. In the twelfth mode, a circuit in which the heat medium circulates among the PCU 133 etc., the battery 138, and the chiller 160 in this order is formed, while the low-temperature radiator 122 is cut off from this circuit.

Next, the thirteenth mode of the low-temperature circuit will be described. In the thirteenth mode, the upper-tier first communication passage 411 couples the third upper-tier opening U3 and the fifteenth upper-tier opening U15 to each other; the upper-tier second communication passage 412 couples the ninth upper-tier opening U9 and the thirteenth upper-tier opening U13 to each other; the lower-tier first communication passage 421 couples the seventh lower-tier opening L7 and the eleventh lower-tier opening L11 to each other; and the lower-tier second communication passage 422 couples the first lower-tier opening L1 and the fifth lower-tier opening L5 to each other. In the thirteenth mode, a circuit in which the heat medium circulates among the PCU 133 etc., the battery 138, the chiller 160, and the low-temperature radiator 122 in this order is formed.

As has been described above, in the eight-way valve V in this embodiment, as the rotary member 400 is rotated relative to the housing 300, the communication states of the spaces S1 to S8 are switched by the upper-tier first communication passage 411, the upper-tier second communication passage 412, the lower-tier first communication passage 421, and the lower-tier second communication passage 422. Thus, for example, when the eight-way valve V is provided in the heat management circuit 100, this heat management circuit 100 can be switched to a plurality of modes.

It is understood by those skilled in the art that the above-described illustrative embodiment is a specific example of the following aspects.

As a first aspect, the following eight-way valve will be described.

The eight-way valve of the first aspect is an eight-way valve that can be provided in a heat management circuit, and includes a housing and a rotary member that is disposed inside the housing and rotatable relative to the housing. The housing includes an annular wall that surrounds an outer circumferential surface of the rotary member and is formed in an annular shape, a first chamber, a second chamber, a third chamber, and a fourth chamber. The first chamber is provided on an outer side of the annular wall in a radial direction of the rotary member and defines, together with the annular wall, a first space and a second space that are separated from each other. The second chamber is provided on the outer side of the annular wall in the radial direction, at a position adjacent to the first chamber in a circumferential direction of the rotary member, and defines, together with the annular wall, a third space and a fourth space that are separated from each other. The third chamber is provided on the outer side of the annular wall in the radial direction, at a position adjacent to the second chamber in the circumferential direction, and defines, together with the annular wall, a fifth space and a sixth space that are separated from each other. The fourth chamber is provided on the outer side of the annular wall in the radial direction, at a position adjacent to both of the third chamber and the first chamber in the circumferential direction, and defines, together with the annular wall, a seventh space and an eighth space that are separated from each other. The annular wall is provided with 16 upper-tier openings that are arrayed at intervals along the circumferential direction, and 16 lower-tier openings that are arrayed at intervals along the circumferential direction. The rotary member includes an upper-tier switching part that switches between opening and closing of each of the 16 upper-tier openings, and a lower-tier switching part that rotates integrally with the upper-tier switching part and switches between opening and closing of each of the 16 lower-tier openings. The upper-tier switching part includes an upper-tier first communication passage, an upper-tier second communication passage, and an upper-tier closing part. The upper-tier first communication passage allows communication between one upper-tier opening among the 16 upper-tier openings and an upper-tier opening that is located at the fourth position from the aforementioned one upper-tier opening toward one side in the circumferential direction. The upper-tier second communication passage allows communication between an upper-tier opening that is located at the tenth position from the aforementioned one upper-tier opening toward the one side in the circumferential direction and an upper-tier opening that is located at the 14th position from the aforementioned one upper-tier opening toward the one side in the circumferential direction. The upper-tier closing part closes 12 upper-tier openings among the 16 upper-tier openings other than the four upper-tier openings between which the upper-tier first communication passage and the upper-tier second communication passage allow communication. The lower-tier communication part includes a lower-tier first communication passage, a lower-tier second communication passage, and a lower-tier closing part. The lower-tier first communication passage allows communication between one lower-tier opening among the 16 lower-tier openings that is located under an upper-tier opening located at the eighth position from the aforementioned one upper-tier opening toward the one side in the circumferential direction and a lower-tier opening that is located at the fourth position from the aforementioned one lower-tier opening toward the one side in the circumferential direction. The lower-tier second communication passage allows communication between a lower-tier opening that is located at the tenth position from the aforementioned one lower-tier opening toward the one side in the circumferential direction and a lower-tier opening that is located at the 14th position from the aforementioned one lower-tier opening toward the one side in the circumferential direction. The lower-tier closing part closes 12 lower-tier openings among the 16 lower-tier openings other than the four lower-tier openings between which the lower-tier first communication passage and the lower-tier second communication passage allow communication. As the 16 upper-tier openings, a first upper-tier opening, a second upper-tier opening, a third upper-tier opening, and a fourth upper-tier opening; a fifth upper-tier opening, a sixth upper-tier opening, a seventh upper-tier opening, and an eighth upper-tier opening; a ninth upper-tier opening, a tenth upper-tier opening, an eleventh upper-tier opening, and a twelfth upper-tier opening; and a thirteenth upper-tier opening, a fourteenth upper-tier opening, a fifteenth upper tier opening, and a sixteenth upper-tier opening are provided. The first upper-tier opening, the second upper-tier opening, the third upper-tier opening, and the fourth upper-tier opening lead to the first chamber and are disposed so as to be arrayed along a forward direction oriented from the first chamber toward the second chamber. The fifth upper-tier opening, the sixth upper-tier opening, the seventh upper-tier opening, and the eighth upper-tier opening lead to the second chamber and are disposed so as to be arrayed along the forward direction. The ninth upper-tier opening, the tenth upper-tier opening, the eleventh upper-tier opening, and the twelfth upper-tier opening lead to the third chamber and are disposed so as to be arrayed along the forward direction. The thirteenth upper-tier opening, the fourteenth upper-tier opening, the fifteenth upper-tier opening, and the sixteenth upper-tier opening lead to the fourth chamber and are disposed so as to be arrayed along the forward direction. As the 16 lower-tier openings, a first lower-tier opening, a second lower-tier opening, a third lower-tier opening, and a fourth lower-tier opening; a fifth lower-tier opening, a sixth lower-tier opening, a seventh lower-tier opening, and an eighth lower-tier opening; a ninth lower-tier opening, a tenth lower-tier opening, an eleventh lower-tier opening, and a twelfth lower-tier opening; and a thirteenth lower-tier opening, a fourteenth lower-tier opening, a fifteenth lower-tier opening, and a sixteenth lower-tier opening are provided. The first lower-tier opening, the second lower-tier opening, the third lower-tier opening, and the fourth lower-tier opening lead to the first chamber and are disposed so as to be arrayed along the forward direction.

The fifth lower-tier opening, the sixth lower-tier opening, the seventh lower-tier opening, and the eighth lower-tier opening lead to the second chamber and are disposed so as to be arrayed along the forward direction. The ninth lower-tier opening, the tenth lower-tier opening, the eleventh lower-tier opening, and the twelfth lower-tier opening lead to the third chamber and are disposed so as to be arrayed along the forward direction. The thirteenth lower-tier opening, the fourteenth lower-tier opening, the fifteenth lower-tier opening, and the sixteenth lower-tier opening lead to the fourth chamber and are disposed so as to be arrayed along the forward direction. In the first chamber, the first space and the second space are separated from each other such that the first upper-tier opening, the third upper-tier opening, the fourth upper-tier opening, and the third lower-tier opening lead to the first space, and that the second upper-tier opening, the first lower-tier opening, the second lower-tier opening, and the fourth lower-tier opening lead to the second space. In the second chamber, the third space and the fourth space are separated from each other such that the fifth upper-tier opening, the sixth upper-tier opening, the fifth lower-tier opening, and the sixth lower-tier opening lead to the third space, and that the seventh upper-tier opening, the eighth upper-tier opening, the seventh lower-tier opening, and the eight lower-tier opening lead to the fourth space. In the third chamber, the fifth space and the sixth space are separated from each other such that the twelfth upper-tier opening and the eleventh lower-tier opening lead to the fifth space, and that the ninth upper-tier opening, the tenth upper-tier opening, the eleventh upper-tier opening, the ninth lower-tier opening, the tenth lower-tier opening, and the twelfth lower-tier opening lead to the sixth space. In the fourth chamber, the seventh space and the eighth space are separated from each other such that the thirteenth upper-tier opening, the fourteenth upper-tier opening, the thirteenth lower-tier opening, and the fourteenth lower-tier opening lead to the seventh space, and that the fifteenth upper-tier opening, the sixteenth upper-tier opening, the fifteenth lower-tier opening, and the sixteenth lower-tier opening lead to the eighth space. A first port is provided at a portion of the first chamber that defines the first space. A second port is provided at a portion of the first chamber that defines the second space. A third port is provided at a portion of the second chamber that defines the third space. A fourth port is provided at a portion of the second chamber that defines the fourth space. A fifth port is provided at a portion of the third chamber that defines the fifth space. A sixth port is provided at a portion of the third chamber that defines the sixth space. A seventh port is provided at a portion of the fourth chamber that defines the seventh space. An eighth port is provided at a portion of the fourth chamber that defines the eighth space.

An eight-way valve of a second aspect is as follows.

The housing includes the annular wall, and includes a housing main body, an upper cover, and a lower cover. The housing main body has such a shape that each of the spaces opens in an up-down direction. The upper cover is connected to the housing main body and closes each of the spaces from above. The lower cover is connected to the housing main body and closes each of the spaces from below.

The embodiment disclosed this time should be construed as being in every respect illustrative and not restrictive. The scope of the present disclosure is indicated not by the description of the embodiment given above but by the claims, and includes all changes within the meaning and scope of equivalents of the claims.

What is claimed is:

1. An eight-way valve, comprising:
   a housing; and
   a rotary member configured to be rotatable relative to the housing, wherein:
   the housing includes an annular wall, a first chamber, a second chamber, a third chamber and a fourth chamber, each of the chambers being respectively configured to define two spaces;
   the annular wall is provided with 16 upper-tier openings and 16 lower-tier openings;
   the rotary member includes an upper-tier switching part configured to switch between opening and closing of each of the 16 upper-tier openings, and a lower-tier switching part configured to switch between opening and closing of each of the 16 lower-tier openings;
   the upper-tier switching part includes an upper-tier first communication passage, an upper-tier second communication passage, and an upper-tier closing part;
   the lower-tier switching part includes a lower-tier first communication passage, a lower-tier second communication passage, and a lower-tier closing part; and
   each of the spaces is respectively provided with a port.

2. The eight-way valve according to claim 1, wherein the rotary member is disposed inside the housing.

3. The eight-way valve according to claim 1, wherein the housing surrounds an outer circumferential surface of the rotary member.

4. The eight-way valve according to claim 1, wherein:
   the first chamber is provided on an outer side of the annular wall in a radial direction of the rotary member; and
   the first chamber is configured to define, together with the annular wall, a first space and a second space that are separated from each other.

5. The eight-way valve according to claim 1, wherein:
   the second chamber is provided on an outer side of the annular wall in a radial direction, at a position adjacent to the first chamber in a circumferential direction of the rotary member; and
   the second chamber is configured to define, together with the annular wall, a third space and a fourth space that are separated from each other.

6. The eight-way valve according to claim 1, wherein:
   the third chamber is provided on an outer side of the annular wall in a radial direction, at a position adjacent to the second chamber in a circumferential direction; and
   the third chamber is configured to define, together with the annular wall, a fifth space and a sixth space that are separated from each other.

7. The eight-way valve according to claim 1, wherein:
   the fourth chamber is provided on an outer side of the annular wall in a radial direction, at a position adjacent to both of the third chamber and the first chamber in a circumferential direction; and
   the fourth chamber is configured to define, together with the annular wall, a seventh space and an eighth space that are separated from each other.

8. The eight-way valve according to claim 1, wherein:
   the housing includes the annular wall; and
   the housing includes a housing main body having such a shape that each of the spaces opens in an up-down direction, an upper cover connected to the housing main body and configured to close each of the spaces from above, and a lower cover connected to the housing main body and configured to close each of the spaces from below.

* * * * *